(12) United States Patent
Sawada et al.

(10) Patent No.: US 7,250,956 B2
(45) Date of Patent: Jul. 31, 2007

(54) METHOD AND APPARATUS FOR COLOR TRANSFORMATION (CONVERSION)

(75) Inventors: Takayuki Sawada, Numazu (JP); Hiroki Umezawa, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 576 days.

(21) Appl. No.: 10/805,379

(22) Filed: Mar. 22, 2004

(65) Prior Publication Data

US 2005/0206651 A1   Sep. 22, 2005

(51) Int. Cl.
G09G 5/02 (2006.01)
(52) U.S. Cl. .................. 345/601; 345/602; 345/604
(58) Field of Classification Search ............. 345/601, 345/602, 604
See application file for complete search history.

(56) References Cited

U.S. PATENT DOCUMENTS 6,643,397 B1 * 11/2003 Kanamori ............... 382/162
6,654,494 B1   11/2003 Sawada et al.
7,084,879 B2 *  8/2006 Sevigny ................. 345/581
2003/0138142 A1   7/2003 Hung

FOREIGN PATENT DOCUMENTS

JP   2003-219193 A   7/2003

OTHER PUBLICATIONS

U.S. Appl. No. 09/641,339, filed Aug. 18, 2000, Sawada et al.

* cited by examiner

Primary Examiner—Matthew C. Bella
Assistant Examiner—Mike Rahmjoo
(74) Attorney, Agent, or Firm—Foley & Lardner LLP

(57) ABSTRACT

Contents of a text processing job is not pre-traced, and at a stage of processing a drawing object, a CLUT combination relating thereto is determined to be ON/OFF. A plurality of drawing objects are associated with a set of CLUT combination, and a CLUT combination which has been once ON is maintained as is ON.

21 Claims, 20 Drawing Sheets

| Application of synthesized CLUT | | | |
|---|---|---|---|
| OFF | Auto | ON | |
| ○ | ◉ | ○ | Drawing object (1) |
| ○ | ◉ | ○ | Drawing object (2) |
| ○ | ○ | ◉ | Drawing object (3) |
| ○ | ◉ | ○ | Drawing object (4) |
| ◉ | ○ | ○ | Drawing object (5) |
| ◉ | ○ | ○ | Drawing object (6) |
| ○ | ◉ | ○ | Drawing object (7) |
| ○ | ◉ | ○ | Drawing object (8) |
| ○ | ○ | ◉ | Drawing object (9) |
| | | | ... |
| ○ | ◉ | ○ | Drawing object (m) |

Line →
↓ Row

FIG. 15

METHOD AND APPARATUS FOR COLOR TRANSFORMATION (CONVERSION)

BACKGROUND OF THE INVENTION

1. Field of the Invention

The present invention relates to an image processing apparatus and an image processing method which can shorten a processing time required when a color conversion is carried out for outputting an input image.

2. Description of the Related Art

When text data including a color image is printed out, color conversion from original data (an input image) into CMYK data for a printer is executed by referring to a look-up table in a color profile (CLUT).

For example, in Jpn. Pat. Appln. KOKAI Publication No. 2003-219193, there is shown an example in which first color conversion means for carrying out color conversion from medium data thereof into data for another medium, and second color conversion means for carrying out color conversion data from another medium into data for the apparatus thereof are provided, and the both have a reversible relationship.

However, there is no description relating to the reduction in the time needed for the color conversion itself.

BRIEF SUMMARY OF THE INVENTION

An object of the present invention is to reduce a time for color conversion required when text data included in a color image is printed out, and to accelerate printout.

According to one aspect of the present invention, there is provided a color image processing apparatus comprising: color look-up table (CLUT) synthesis ON/OFF determining means for determining whether or not a single synthesized CLUT is generated by synthesizing a plurality of CLUTs with respect to a plurality of CLUT groups which are sequentially referred at the time of carrying out color conversion on the drawing object, for each drawing object which is a component of text data, on the basis of attribute information of the drawing object; CLUT synthesis ON/OFF storing means for storing determined results determined by the synthesis ON/OFF determining means, i.e., presence or absence of synthesis; CLUT synthesizing means for generating the single synthesized CLUT by carrying out CLUT synthesis at the time when the determination by the synthesis ON/OFF determining means is varied from OFF to ON; synthesized CLUT storing means for storing the synthesized CLUT which is a result that arbitrary CLUTs among the plurality of CLUT groups are synthesized by the CLUT synthesizing means; and color conversion means for carrying out color conversion with respect to an arbitrary drawing object on the basis of the attribute information of the drawing object and the stored contents of the CLUT synthesis ON/OFF storing means, with reference to CLUTs to be applied to the drawing object from one of the synthesized CLUT and a predetermined CLUTs among the plurality of CLUT groups.

According to another aspect of the present invention, there is provided a color image processing apparatus comprising: CLUT combination-drawing object association generating means for associating CLUT combinations and drawing objects which appear in processing on the basis of processing contents of text data; CLUT synthesis ON/OFF determining means for determining ON/OFF of CLUT synthesis for each CLUT combination on the basis of attribute information of respective objects of the associated drawing object groups; CLUT synthesizing means for synthesizing CLUTs with respect to each CLUT combination in which a determined result by the CLUT synthesis ON/OFF determining means is ON; and color conversion means for carrying out color conversion with respect to each of the individual drawing objects on the basis of the attribute information of each drawing object and the determined result of the CLUT synthesis ON/OFF with which each drawing object is associated, with reference to one of the synthesized CLUT and a plurality of unsynthesized CLUT groups.

According to another aspect of the present invention, there is provided a color image processing method comprising: determining whether or not a single synthesized CLUT is generated by synthesizing a plurality of CLUTs with respect to a plurality of CLUT groups which are sequentially referred at the time of carrying out color conversion on the drawing object, for each drawing object which is a component of text, on the basis of attribute information of the drawing object; holding a result, which has been determined on the basis of the attribute information of drawing objects, showing whether or not a single synthesized CLUT is generated by synthesizing a plurality of CLUTs; generating the single synthesized CLUT by carrying out CLUT synthesis at the time when the result, which has been determined on the basis of the attribute information of drawing objects, showing whether or not a single synthesized CLUT is generated by synthesizing a plurality of CLUTs, is varied from OFF to ON; generating and holding the synthesized CLUT when it is determined that the single synthesized CLUT is generated by synthesizing a plurality of CLUTs; and carrying out color conversion with respect to an arbitrary drawing object on the basis of the attribute information of the drawing object and the result, which has been determined on the basis of the attribute information of the drawing object, showing whether or not the single synthesized CLUT is generated by synthesizing a plurality of CLUTs, with reference to CLUTs to be applied to the drawing object from one of the synthesized CLUT and a predetermined CLUT among the plurality of CLUT groups.

According to another aspect of the present invention, there is provided a color image processing method comprising: associating CLUT combinations and drawing objects which appear in processing on the basis of processing contents of text data; determining ON/OFF of CLUT synthesis for each CLUT combination on the basis of attribute information of each object of the associated drawing object groups; synthesizing CLUTs with respect to each CLUT combination in which a determined result of the CLUT synthesis ON/OFF; and carrying out color conversion with respect to each of the individual drawing objects on the basis of the attribute information of each drawing object and the determined result of CLUT synthesis ON/OFF with which each drawing object is associated, with reference to one of the synthesized CLUT and a plurality of unsynthesized CLUT groups.

Additional objects and advantages of an aspect of the invention will be set forth in the description which follows, and in part will be obvious from the description, or may be learned by practice of the invention. The objects and advantages of an aspect of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated presently preferred in and constitute a part of the specification, illustrate embodiments of the invention, and together with the general description given above and the detailed description of the embodiments preferred given below, serve to explain the principles of an aspect of the invention.

FIG. 15 is a schematic diagram for explaining one example of a display of a user interface when it is expressly designated for each drawing object whether a synthesized CLUT is used or not in the color conversion apparatus shown in FIG. 8;

DETAILED DESCRIPTION OF THE INVENTION

Hereinafter, an embodiment of the present invention will be described with reference to the drawings.

Figure 1:
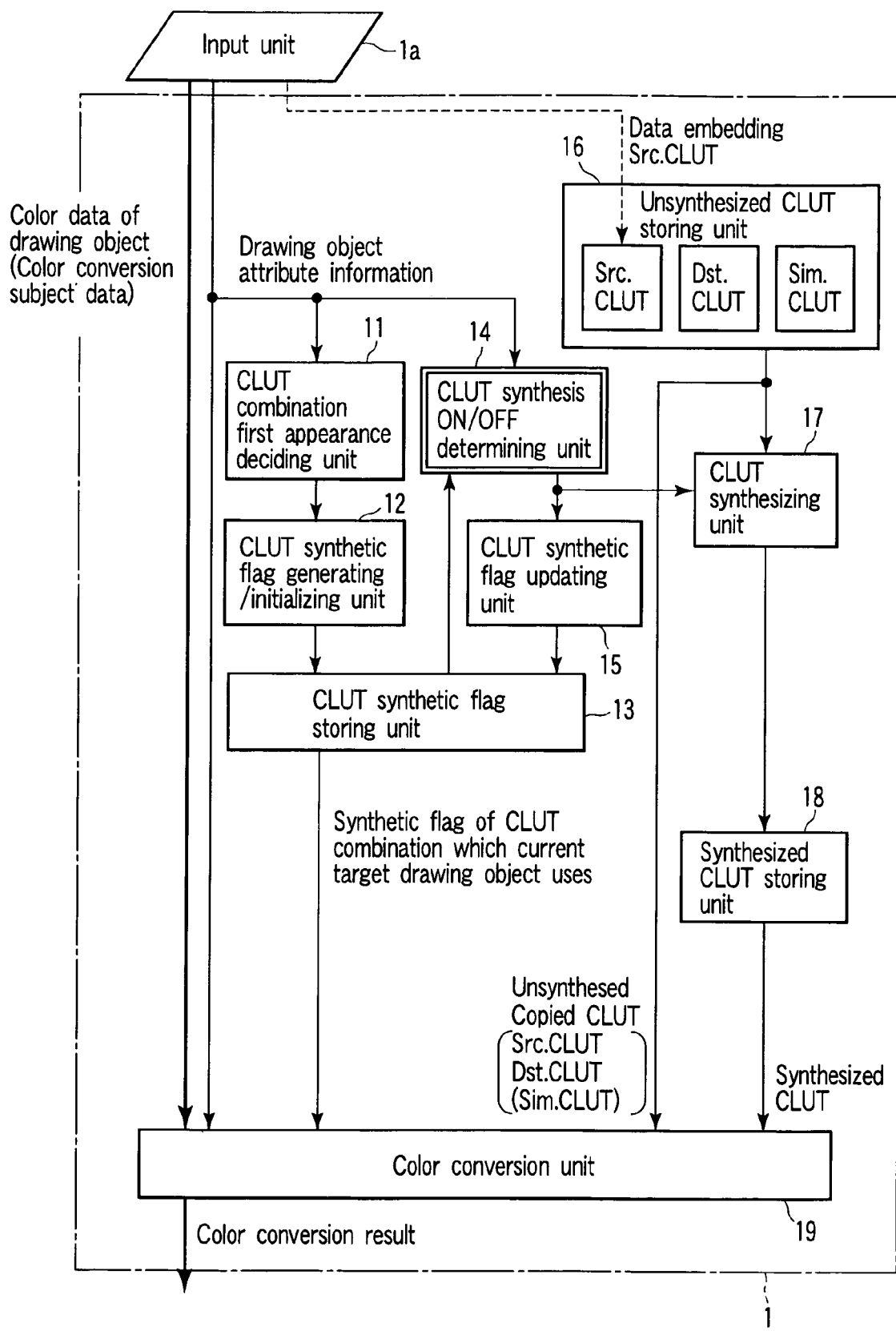
FIG. 1 is a schematic block diagram for explaining one example of a color conversion apparatus to which an embodiment of the present invention is applied.

FIG. 1 is a schematic block diagram for explaining one example of a color conversion apparatus to which the embodiment of the present invention is applied.

As shown in FIG. 1, a color conversion apparatus 1 has a CLUT (color look-up table) combination first appearance deciding unit 11, a CLUT synthetic flag generating/initializing unit 12, a CLUT synthetic flag storing unit 13, a CLUT synthesis ON/OFF determining unit 14, a CLUT synthetic flag updating unit 15, an unsynthesized CLUT storing unit 16, a CLUT synthesizing unit 17, a synthesized CLUT storing unit 18, and a color conversion unit 19. Note that image information, text data, or the like is supplied to the color conversion apparatus 1 via, for example, a data input unit (for example, a scanner for converting information typified by an image or a text into an image signal, or an RGB signal input unit which can directly input RGB signals, or a digital signal input unit which can directly input a digital image from a digital camera or the like) 1a.

The CLUT combination first appearance deciding unit 11 outputs a decided result on whether or not a CLUT combination which a drawing object uses is the first appearance (a combination appearing for the first time) on the basis of drawing object attribute information which is characteristic of the drawing object inputted to the data input unit 1a. The drawing object attribute information is generally named for information on CLUT groups needed for color conversion of a drawing object, information showing whether the drawing object is a bitmap or a non-bitmap, and information such as the number of pixels, the number of colors, and an express instruction of whether or not a synthesized CLUT is applied (an instruction of whether or not it is designated in advance). At the CLUT combination first appearance deciding unit 11, the information on the CLUT groups needed for color conversion of a drawing object is used.

On the basis of the decided result, which has been decided at the CLUT combination first appearance deciding unit 11, of whether or not the CLUT combination is the first appearance, the CLUT synthetic flag generating/initializing unit 12 generates and initializes a CLUT synthetic flag when it is the first appearance, and writes the CLUT synthetic flag into the CLUT synthetic flag storing unit 13 (the result in which the CLUT synthetic flag is generated and initialized is reflected). The CLUT synthetic flag shows whether CLUT synthesis is made to be on or off for each combination of the CLUT combinations. The CLUT synthetic flags for all of the respective CLUT combinations in a job are made to be a table, for example, as will be described later by using FIG. 6, and are maintained as a CLUT combination-synthetic flag correspondence list L1 in the CLUT synthetic flag storing unit 13.

The CLUT synthesis ON/OFF determining unit 14 determines synthesis ON (there is synthesis)/OFF (there is no synthesis) on the basis of the drawing object attribute information and the CLUT synthetic flags, and outputs the result.

The CLUT synthetic flag updating unit 15 updates the synthetic flag of the CLUT to be ON when synthesis is changed from OFF to ON on the basis of the determined result of the synthesis ON/OFF by the CLUT synthesis ON/OFF determining unit 14, and writes it into the CLUT synthetic flag storing unit 17 (it is reflected that the synthetic flag of CLUT is turned ON).

The unsynthesized CLUT storing unit 16 stores source (Src.) CLUT before being synthesized, destination (Dst.) CLUT, and simulation (Sim.) CLUT. In the unsynthesized CLUT storing unit 16, a plurality of CLUTs (of a plurality of the respective Src., Dst., and Sim.) which may be used by a print job can be registered in advance.

The CLUT synthesizing unit 17 synthesizes the plurality of CLUTs configuring the CLUT combinations into one CLUT as shown in FIGS. 2A, 2B, 3A, and 3B. Specifically, with respect to a color data groups corresponding to the nodes of the initial CLUT, i.e., the Src. CLUT, color conversion is carried out by sequentially referring to the CLUT groups before being synthesized (including the Src. CLUT itself), and the color data groups in the final result serve as the CLUT data in the synthesized result.

The synthesized CLUT storing unit 18 stores the CLUT which is the synthesized result by the CLUT synthesizing unit 17 (the CLUT synthesized by the CLUT synthesizing unit 17, i.e., the synthesized CLUT).

The color conversion unit 19 carries out color conversion on color data of the drawing object by selectively using the synthesized CLUT or the plurality of unsynthesized CLUT groups, on the basis of the attribute information of the drawing object (an express designation of whether or not the CLUT is applied) and a synthesis ON/OFF flag of a CLUT combination which the drawing object uses.

Incidentally, a CLUT is usually a correspondence table between data of a color space of a device (RGB or CMYK) and a color space which does not depend on a device (CIEXYZ, L*a*b*, and the like, which are generally named a profile connection space: PCS).

Figure 2A:
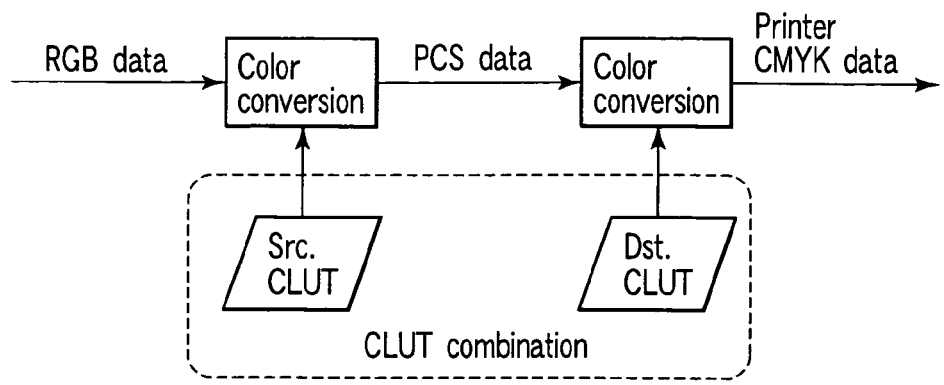
FIGS. 2A and 2B are schematic diagrams for explaining concepts of a CLUT combination and a CLUT synthesis.
Figure 3A:
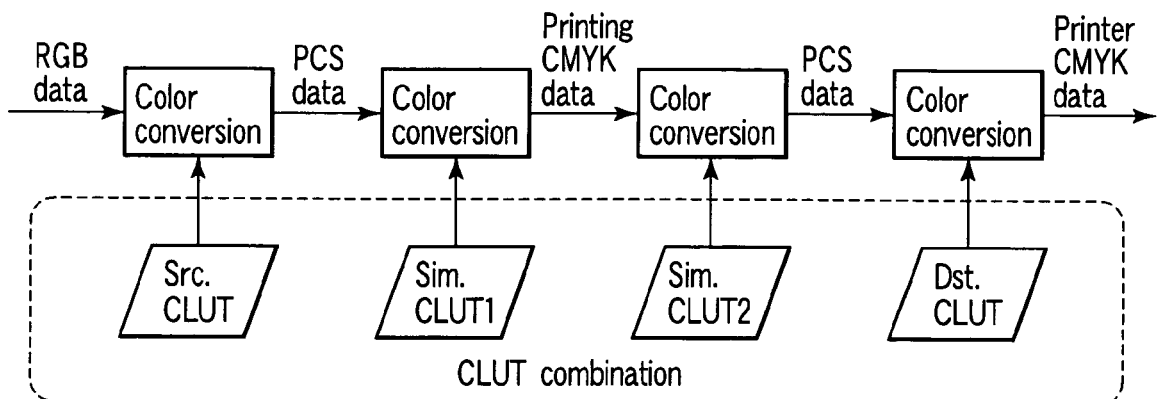
FIGS. 3A and 3B are schematic diagrams for explaining an example in a case of the concepts of the CLUT combination and the CLUT synthesis, which are shown in FIG. 1, with a printing simulation.

Therefore, as shown in FIG. 2A, when text data including a color image expressed in RGB is printed out, the two-step color conversion is needed in which color conversion is carried out from RGB into PCS with reference to the Src. CLUT, and color conversion is further carried out from PCS into CMYK with reference to the Dst. CLUT. Note that, in a color conversion flow with a commercial printing simulation, as shown in FIG. 3A, because there arises a case where it is necessary to carry out color conversion by using two CLUTs (a Sim. CLUT 1 and a Sim. CLUT 2) in the printing CMYK profile used for simulation during the time of the two color conversions shown in FIG. 2A, the total number of color conversions (the number of steps) is four.

In the color conversion apparatus of the present invention shown in FIG. 1, there is provided the feature that a synthesized CLUT is used in which the CLUTs which are respectively used for the two-step (the Src. CLUT and the Dst. CLUT) color conversion shown in FIG. 2A, and four-step (the Src. CLUT, the Sim CLUT 1, the Sim CLUT 2, and the Dst. CLUT) color conversion shown in FIG. 3A are combined, and synthesized into one color conversion in advance (refer to FIGS. 2B and 3B).

Figure 2B:
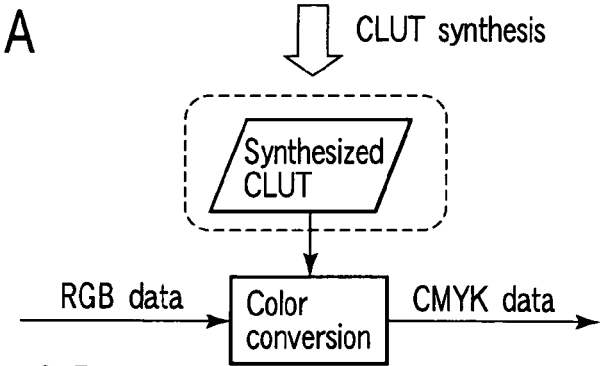
Figure 3B:
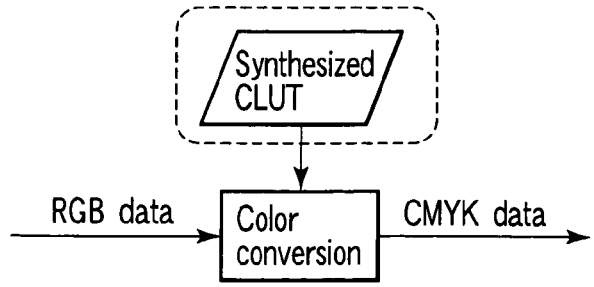

By using a synthesized CLUT as shown FIG. 2B or FIG. 3B, a processing time required for color conversion can be reduced, and it is possible to shorten a printing time needed at the time of printing-out text data including color image. Note that the profile including a synthesized CLUT as described above is called a device link profile.

However, with respect to such text data in which the number of colors is little, i.e., about ten-odd colors, there are cases in which the processing time of the entire text processing required for color conversion for printout increases due to the processing time needed for the CLUT synthesis. Namely, a method in which CLUTs are synthesized and color conversions are integrated into one step is not necessarily effective in the processings for all text included in a color image.

Hereinafter, one example of the operations of the color conversion apparatus shown in FIG. 1 will be described. Note that, in the present example, an example will be described in which a print job is processed as a job of text processing inputted to the data input unit 1*a*.

Figure 4:
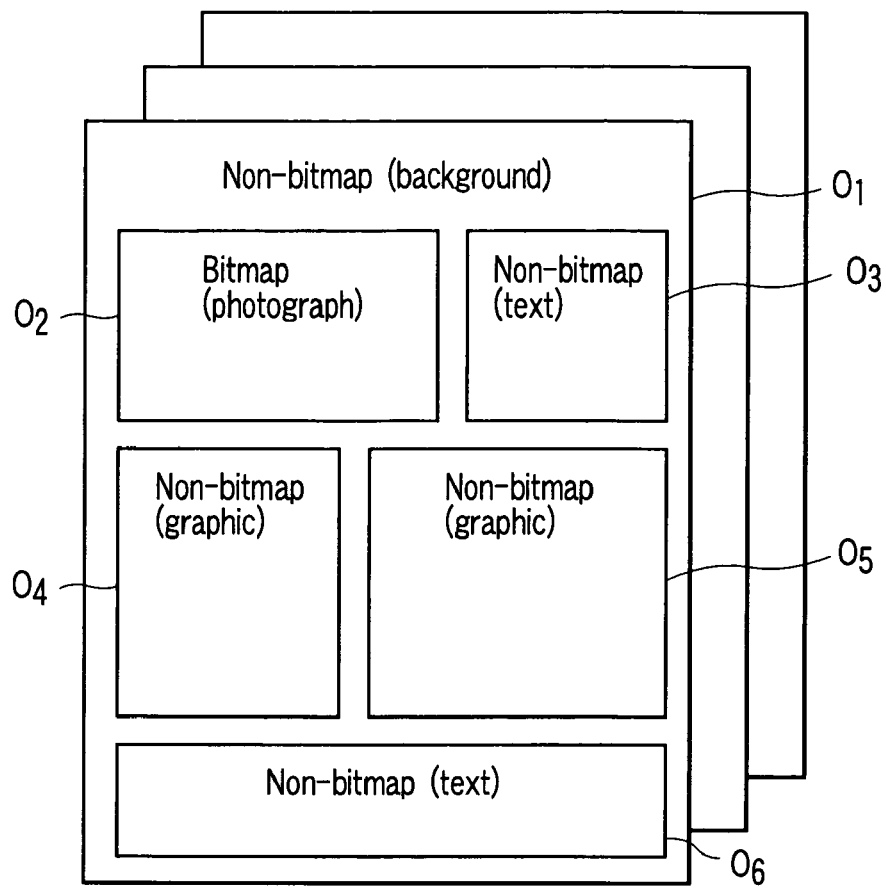
FIG. 4 is a schematic diagram for explaining a relationship between text data and drawing objects which will be objects for text processing job.

Text data handled in a print job is generally, as one example is shown in FIG. 4, an aggregate of a plurality of drawing objects such as a non-bitmap (background) $O_1$, a bitmap (photograph) $O_2$, a non-bitmap (text (character strings)) $O_3$, a non-bitmap (graphic) $O_4$, a non-bitmap (graphic) $O_5$, and a non-bitmap (text (character strings)) $O_6$. Further, the text data is not necessarily in one page amounts, and is generally an arbitrary number of pages (n pages).

Figure 5:
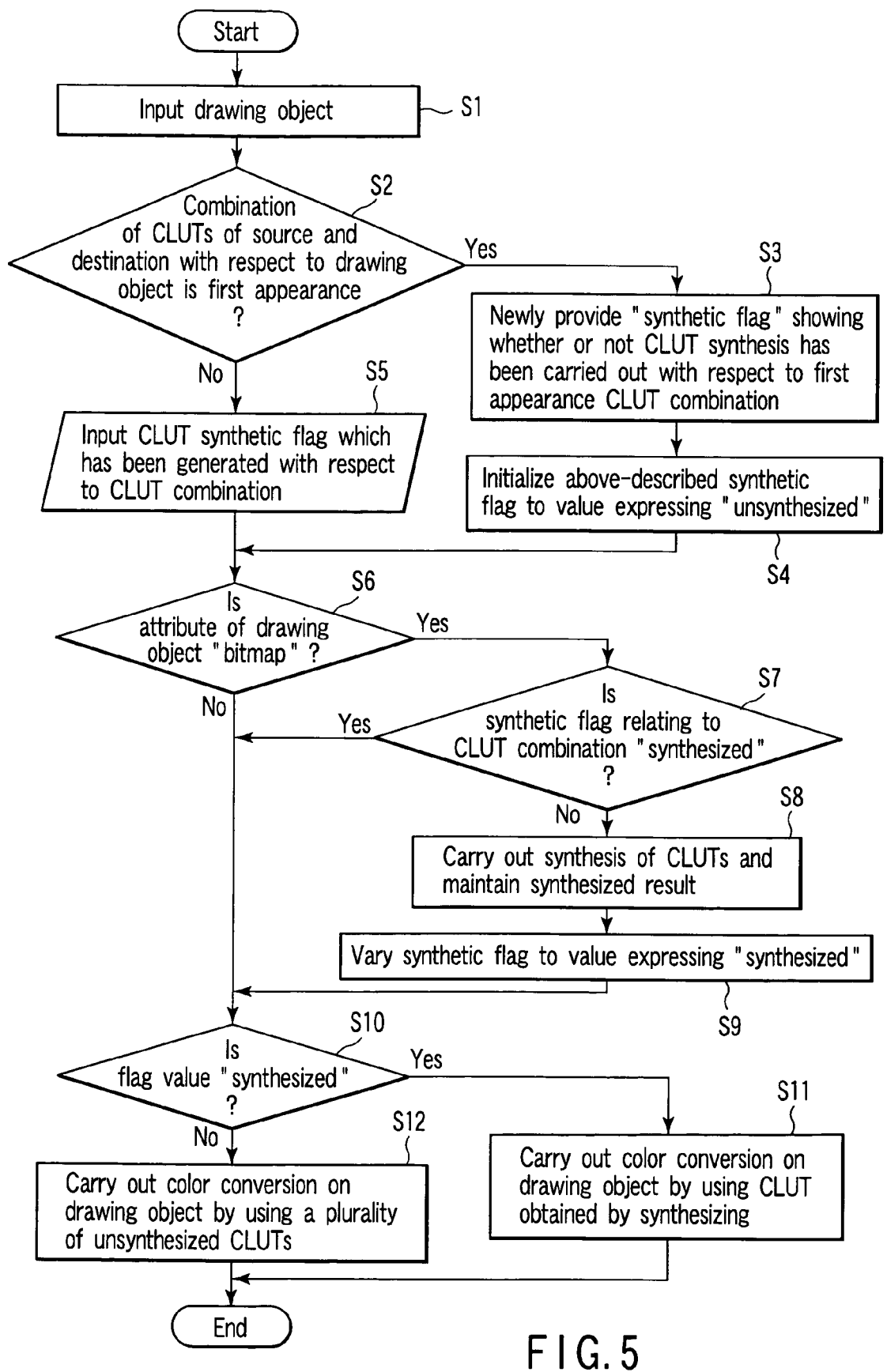
FIG. 5 is a flowchart (including a process of determining synthesis ON/OFF of the CLUT combination related thereto) for explaining one example of processing for each drawing object in the color conversion apparatus shown in FIG. 1.

As shown in FIG. 5, when one drawing object is inputted (S1), it is decided whether or not the combination of the CLUTs (to be applied to) that the drawing object uses, i.e., the combination of the Src. CLUT and the Dst. CLUT is the first appearance (S2).

In step S2, when the combination of the CLUTs is the first appearance (S2-Yes), a "synthetic flag" denoting whether or not the first appearance CLUT combination has been synthesized is generated (S3), and the CLUT synthetic flag storing unit 13 is initialized to a value expressing "unsynthesized", i.e., OFF (S4). On the other hand, in step S2, when the combination of CLUTs has existed (S2-No), the "synthetic flag" which has already been generated will be referred in the following processings (S5).

Next, at the CLUT synthesis ON/OFF determining unit 14, on the basis of the attribute information of the inputted drawing object, it is specified that the drawing object is bitmap data or non-bitmap data (S6).

In step S6, when it is specified that the attribute of the drawing object is bitmap data (S6-Yes), it is decided whether or not the CLUTs (to be applied to) that the drawing object uses have been synthesized (S7, it is checked whether the "synthetic flag" denoting the combination of CLUTs is ON or OFF).

In step S7, when the "synthetic flag" is OFF (the CLUTs have not been synthesized) (S7-No), the CLUTs are synthesized (S8), and the "synthetic flag" is updated to be ON (S9, the "synthetic flag" is varied to a value expressing "synthesized"). On the other hand, when the result is ON (S7-No), because the synthesis of the CLUTs has been carried out (the CLUTs have already been synthesized), the synthetic flag is not updated (the "flag" which the CLUT synthetic flag updating unit 15 maintains will be maintained as is).

Further, in (retroactively to) step S6, when it is specified that the drawing object is data other than bitmap data (non-bitmap data) (S6-No), naturally, the "synthetic flag" is maintained as is (is not updated). Note that, the flow shown in FIG. 5 is a flow based on the point of view that, when the CLUTs have been synthesized, the synthesized CLUT is used even if the drawing object is non-bitmap data.

In this way, ON/OFF of syntheses of the inputted image data, i.e., the CLUTs that the attribute information of the drawing object to be applied is currently in being processed are sequentially determined, color conversion of the color image data of the drawing object is executed in accordance with the values of the "synthetic flags" determined at that point in time, i.e., the "synthetic flags" maintained in the CLUT synthetic flag storing unit 13 (S10). Namely, when the "synthetic flag" determined in advance on the basis of the attribute information of each drawing object is ON (S10-Yes), color conversion is carried out on the drawing object by using a synthesized CLUT (S11). Further, when a CLUT synthesis is OFF (S10-No), color conversion is carried out on the drawing object by using a plurality of unsynthesized CLUT groups (S12).

Figure 6:
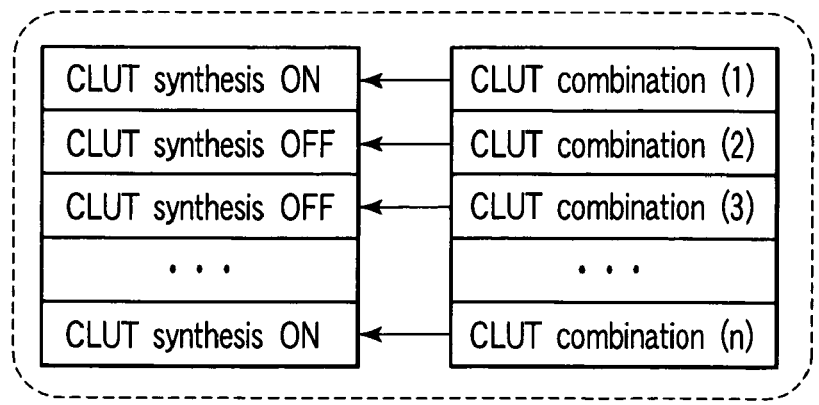
FIG. 6 is a schematic diagram for explaining a CLUT combination-synthesis ON/OFF flag correspondence list in the color conversion apparatus shown in FIG. 1.

FIG. 6 shows one example of the CLUT-synthetic flag correspondence list described above, and for example, shows that CLUT synthesis is ON with respect to a CLUT combination (1) (a synthesized CLUT is prepared), CLUT synthesis is OFF with respect to CLUT combinations (2) to (3) (a synthesized CLUT is not prepared), . . . , CLUT synthesis is ON with respect to a CLUT combination (n) (a synthesized CLUT is prepared).

Note that, in the processing flow shown in FIG. 5, synthesizing/unsynthesizing of the CLUTs (CLUT synthesis ON/OFF) are carried out on the basis of "whether it is bitmap data or not" among the attribute information of the drawing object. However, as a condition for branch in place thereof, it is possible to use "express instruction information (designated in advance for each object) on whether or not a synthesized CLUT is applied" among the attribute of the drawing object.

Figure 7:
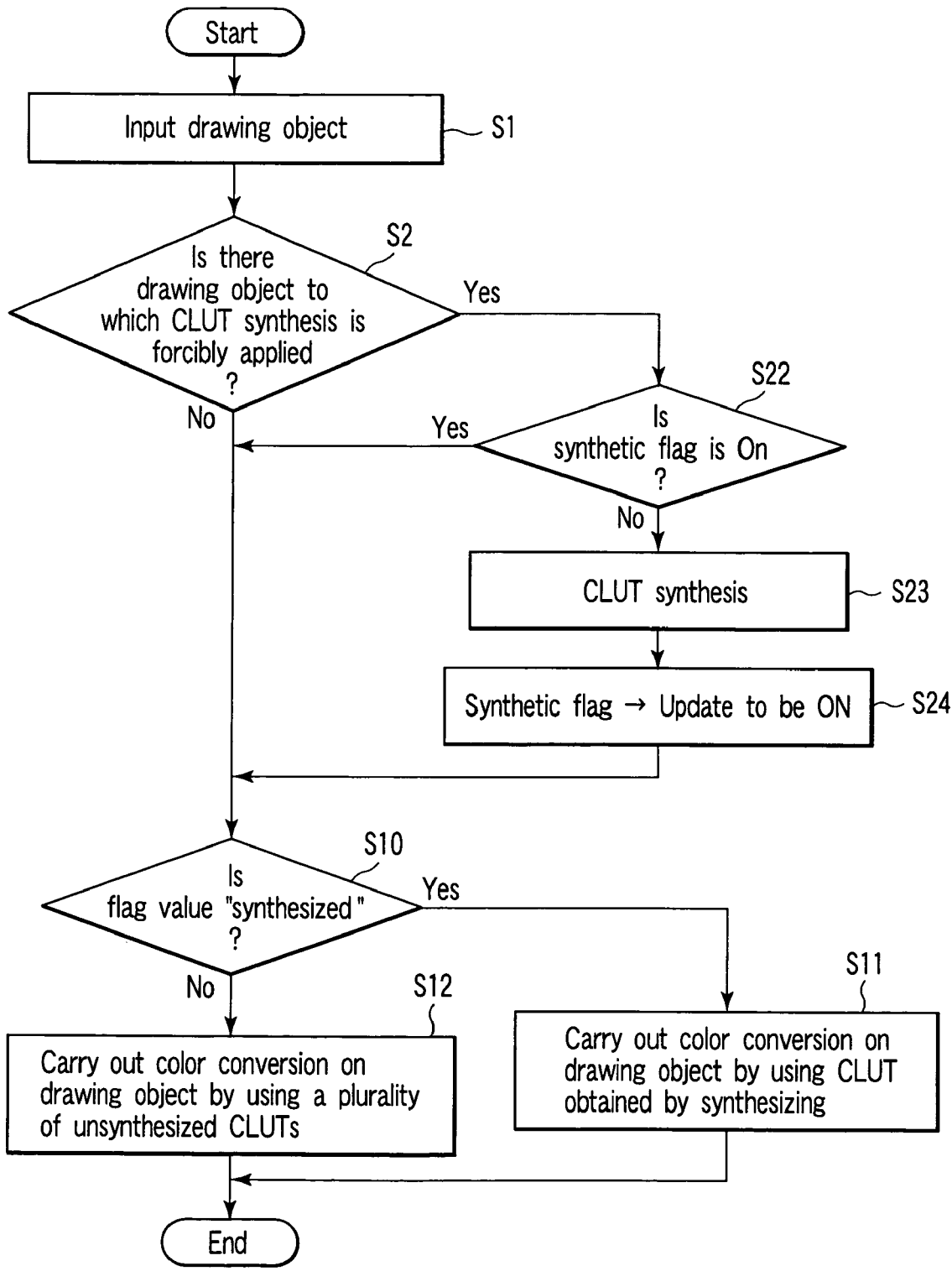
FIG. 7 is a flowchart for explaining one example of processing using "express instruction information on whether a synthesized CLUT is applied or not (which is designated in advance for each object)" among attribute information of the drawing object in the flow of color conversion shown in FIG. 5.

For example, as shown in FIG. 7, it is decided whether or not the CLUT to be used with respect to the drawing object inputted to the data input unit 1a is instructed (S21), and when it is instructed to use the synthesized CLUT (there is express instruction information) (S21-Yes), it is checked whether or not the "synthetic flag" of the CLUT combination which the drawing object uses have been synthesized (i.e., the synthetic flag is ON) (S22), and when the result is OFF (S22-No), synthesis of the CLUTs may be carried out (S23).

Note that, in step S23, when the CLUTs have been synthesized, the "synthetic flag" is updated to be ON (S24).

It goes without saying that, when the "synthetic flag" is ON (S22-Yes), synthesis of the CLUTs has been executed, and the synthetic flag is not updated.

Further, in (retroactively to) step S21, when it is not instructed such that the drawing object uses a synthesized CLUT (S21-No), the "synthetic flag" is maintained as is (is not updated).

Namely, FIG. 7 can be replaced with steps S6 to S9 in the processing flow described above by FIG. 5.

Figure 8:
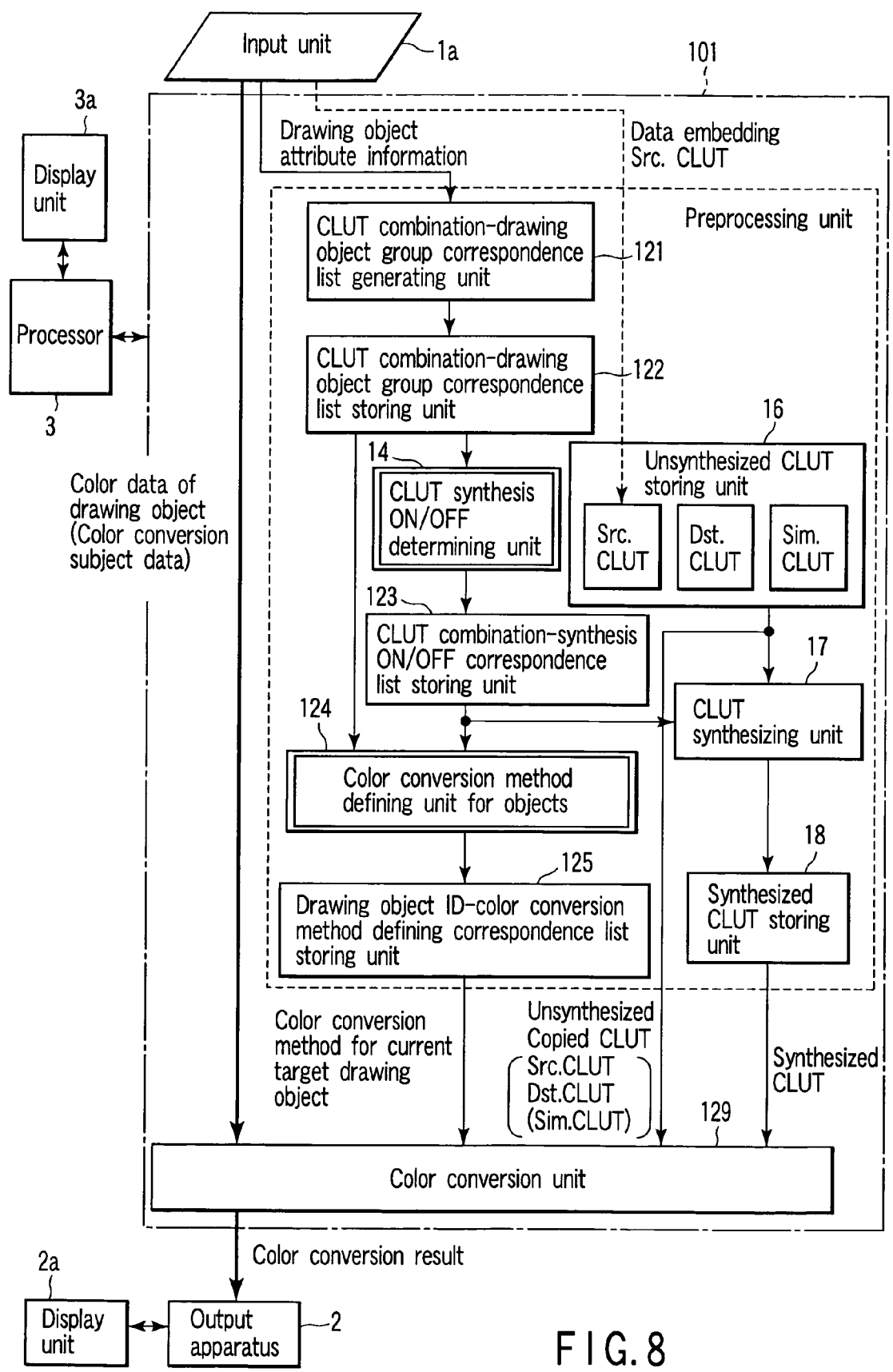
FIG. 8 is a schematic block diagram for explaining another example of the color conversion apparatus to which the embodiment of the present invention is applied.

FIG. 8 is a block diagram for explaining another example of the color conversion apparatus to which the embodiment of the present invention is applied. Note that configurations which are similar to or the same as the configurations (factors) described by FIG. 1 are denoted by the same reference numerals, and detailed descriptions thereof will be omitted.

As shown in FIG. 8, a color conversion apparatus 101 has the data input unit 1a, a CLUT combination-drawing object group correspondence list generating unit 121, a CLUT combination-drawing object group correspondence list storing unit 122, the CLUT synthesis ON/OFF determining unit 14, a CLUT combination-synthesis ON/OFF correspondence list storing unit 123, a color conversion method defining unit for drawing objects 124, a drawing object-color conversion method defining correspondence list storing unit 125, the unsynthesized CLUT storing unit 16, the CLUT synthesizing unit 17, the synthesized CLUT storing unit 18, and a color conversion unit 19. Note that there are cases in which the color conversion apparatus 101 is connected to, for example, a printer apparatus 2, or is housed in a text data processing apparatus (processor) 3. In this case, it is possible to display arbitrary operations in color conversion processing or some other information to be provided to a user, on a display apparatus or a display unit 3a connected to (may be integrated in) the processor 3, or a display unit 2a provided at the printer apparatus 2.

The CLUT combination-drawing object group correspondence list generating unit 121 generates a CLUT combination-drawing object group correspondence list on the basis of the attribute information of all of the drawing objects in a text processing job. The CLUT combination-drawing object group correspondence list is an association table of CLUT combinations and drawing objects (which drawing object uses which CLUT combination) as shown by segment A in FIG. 9. Note that the correspondences between the CLUT combinations and the drawing objects as shown by segment A in FIG. 9 respectively show that, for example, respectively, the drawing objects (1) and (7) are associated with the CLUT combination (1), and for example, the drawing objects (2), (3) and (5) are associated with the CLUT combination (2), and for example, the drawing objects (4), (8) and (9), . . . , (m) are associated with the CLUT combination (3), . . . , and for example, the drawing object (6) is associated with the CLUT combination (n). Further, the generated association table, i.e., the CLUT combination-drawing object group correspondence list is stored in the CLUT combination-drawing object group correspondence list storing unit 122.

The results determined by the CLUT synthesis ON/OFF determining unit 14, i.e., CLUT combination-synthesis ON/OFF are stored in the CLUT combination-synthesis ON/OFF correspondence list storing unit 123. Further, the CLUT combination-synthesis ON/OFF correspondence list is table data of the results of determining of CLUT combination-synthesis ON/OFF with respect to all of the CLUT combinations in the job, as shown by segment B in FIG. 9.

The CLUT combination-synthesis ON/OFF correspondence list is the same type as the list described by using FIG. 6 in the color conversion apparatus. 1 shown in FIG. 1. However, in the color conversion apparatus 101 described by FIG. 8, the CLUT combination-synthesis ON/OFF correspondence list is, in accordance with a flow as shown by the latter part in FIG. 10, determined with respect to all of the inputted drawing objects before the job of the text processing inputted to, for example, the input unit 1a is started.

Figure 9:
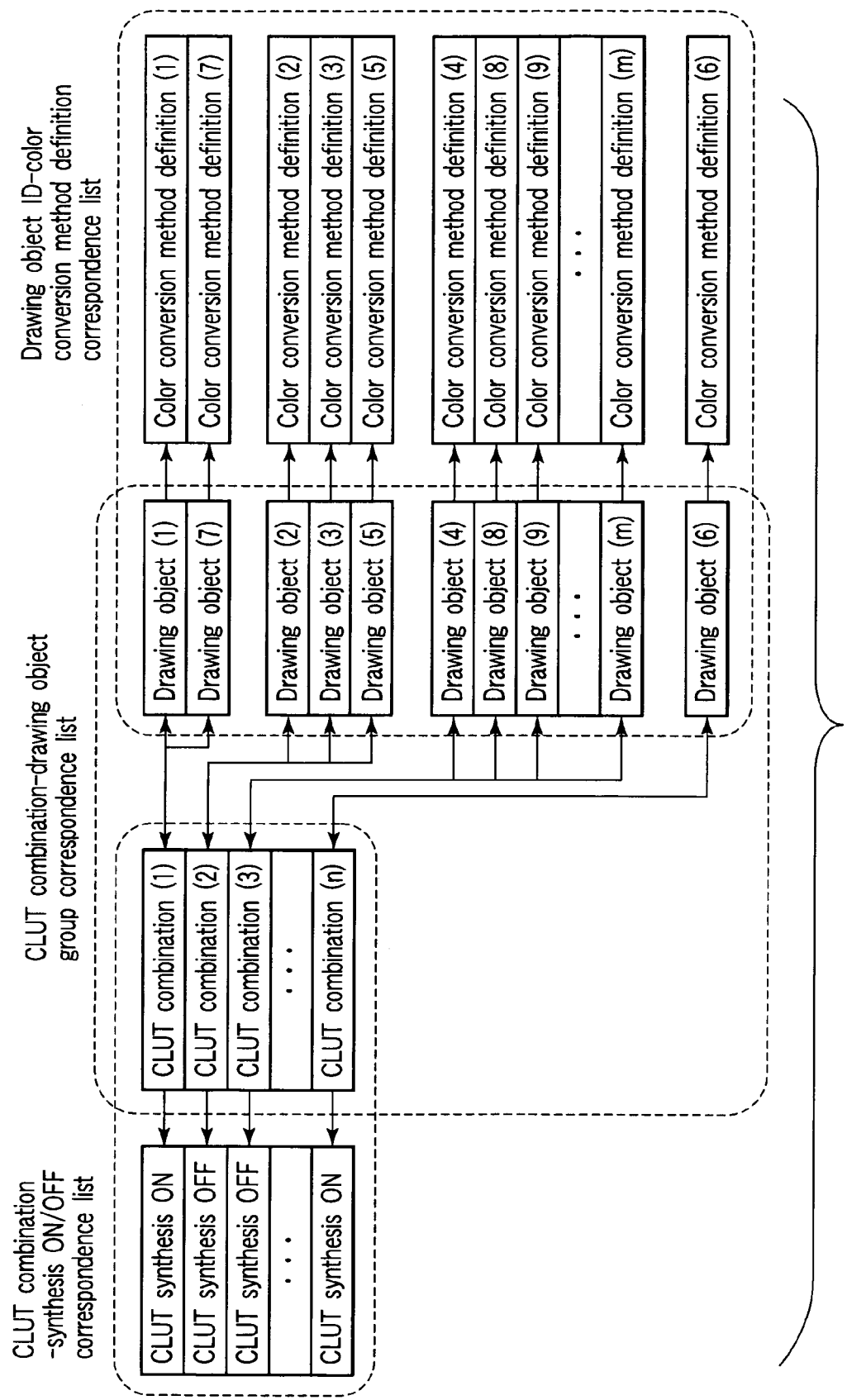
FIG. 9 is a schematic diagram for explaining a CLUT combination-synthesis ON/OFF list, a CLUT combination-drawing object group correspondence list, and a drawing object-color conversion method definition correspondence list in the color conversion apparatus shown in FIG. 8.

The color conversion method defining unit for drawing objects 124 determines as "color conversion method definition" whether a synthesized CLUT or a plurality of unsynthesized CLUT groups are applied to the drawing object, on the basis of the determined results of synthesis ON/OFF of the CLUT combinations associated with a target drawing object, and the attribute information of the drawing object. Namely, at the color conversion method defining unit 124, it is defined whether the CLUTs to be applied to the drawing object which is a processing object are newly generated by synthesizing or some of the plurality of CLUTs which have been prepared in advance are used as the CLUTs to be applied to the drawing object. The result of the color conversion method definition defined by the color conversion method defining unit 124 are stored in the drawing object-color conversion method definition correspondence list storing unit 125. Note that "the drawing object-color conversion method definition correspondence list" stored in the correspondence list storing unit 125 is table data, as shown by segment C in FIG. 9, in which the "color conversion method definition" on whether or not a synthesized CLUT is applied to all of the drawing objects in the job is described. Note that the correspondences of the drawing objects and the color conversion method definitions as shown by segment C in FIG. 9 show that, for example, respectively, the color conversion definition (1) corresponds to the drawing object (1), and the color conversion definition (7) corresponds to the drawing object (7).

The color conversion unit 129 carries out color conversion on color data of a drawing object by selectively using a synthesized CLUT or a plurality of unsynthesized CLUT groups, on the basis of the color conversion definitions defined by the color conversion method defining unit 124 with respect to the current target drawing object.

Hereinafter, a processing flow in the color conversion apparatus 101 shown in FIG. 8 will be described by using FIGS. 10 to 14.

Figure 10:
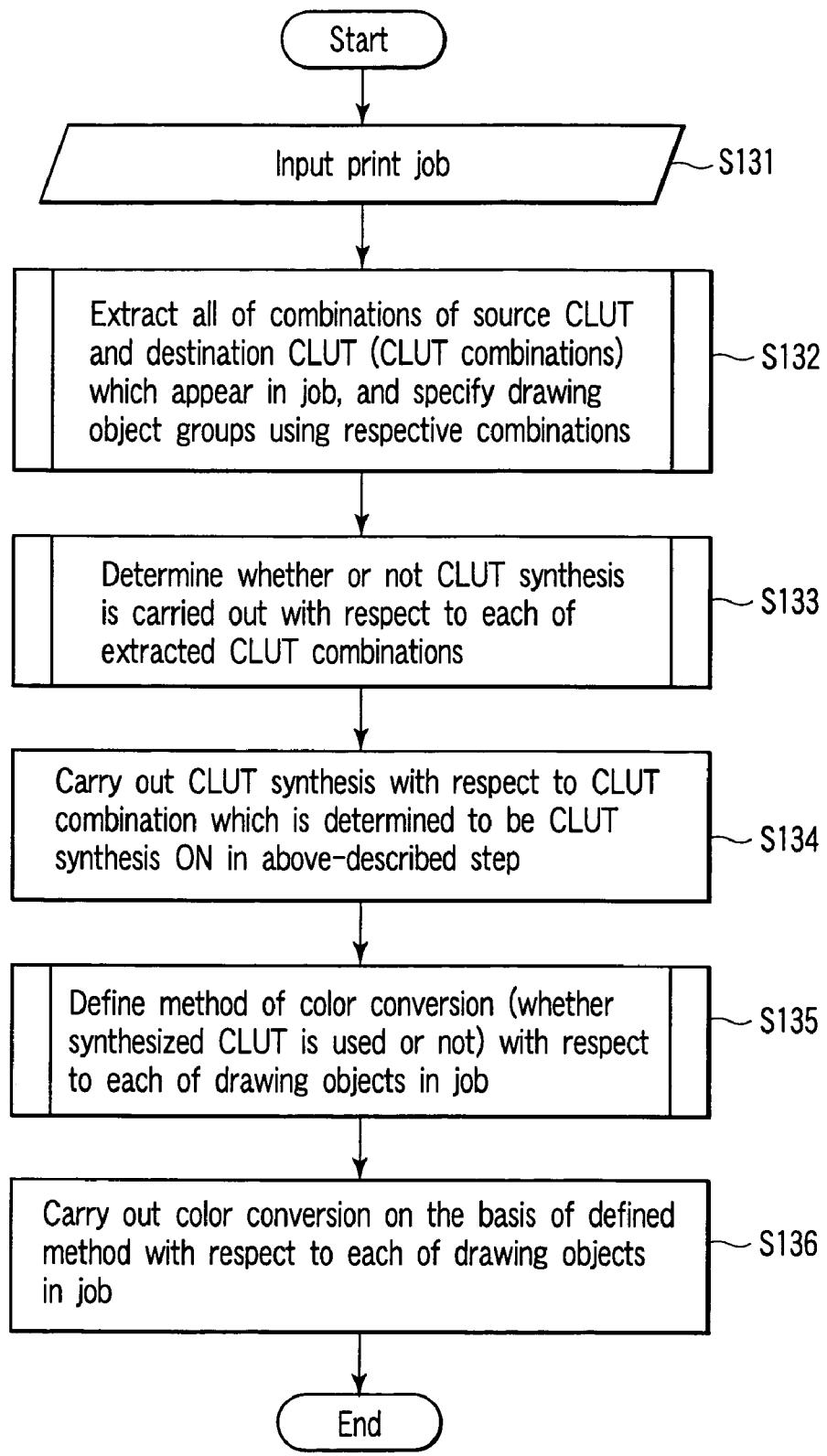
FIG. 10 is a flowchart for explaining one example of processing for each text processing job (as an example, a print job) in the color conversion apparatus shown in FIG. 8.

Due to a print job being inputted to the input unit 1a, preprocessing as shown in FIG. 10 is carried out.

In detail, when text data is inputted to the input unit 1a in step S131, at the CLUT combination-drawing object group correspondence list generating unit 121, combinations of all of the Src. CLUTs and the Dst. CLUTs which appear in the job are extracted, and the drawing object groups for which the respective CLUTs are used are specified (individual drawing objects and the CLUTs to be applied to the objects are associated with one another, S132).

Next, it is determined by the CLUT synthesis ON/OFF determining unit 14 whether the CLUTs are synthesized or not (CLUT synthesis ON/OFF) with respect to the respective combinations of the CLUTs extracted in step S132 (S133).

CLUT synthesis is carried out with respect to the combination of the CLUTs on which it is determined that the CLUTs are synthesized (synthesized CLUT is ON) in step S133 (a new CLUT is synthesized by the CLUT synthesizing unit 17, S134)

Next, it is defined whether or not a method for color conversion, i.e., a synthesized CLUT is used with respect to each drawing object in the job by the color conversion method defining unit 124 (S135).

Hereinafter, color conversion is carried out for each drawing objects in the job on the basis of the method defined at the color conversion method defining unit 124 (color conversion is carried out by using an arbitrary CLUT among a synthesized CLUT or a plurality of unsynthesized CLUT groups, on the basis of the defined color conversion method definition, S136).

Figure 11:
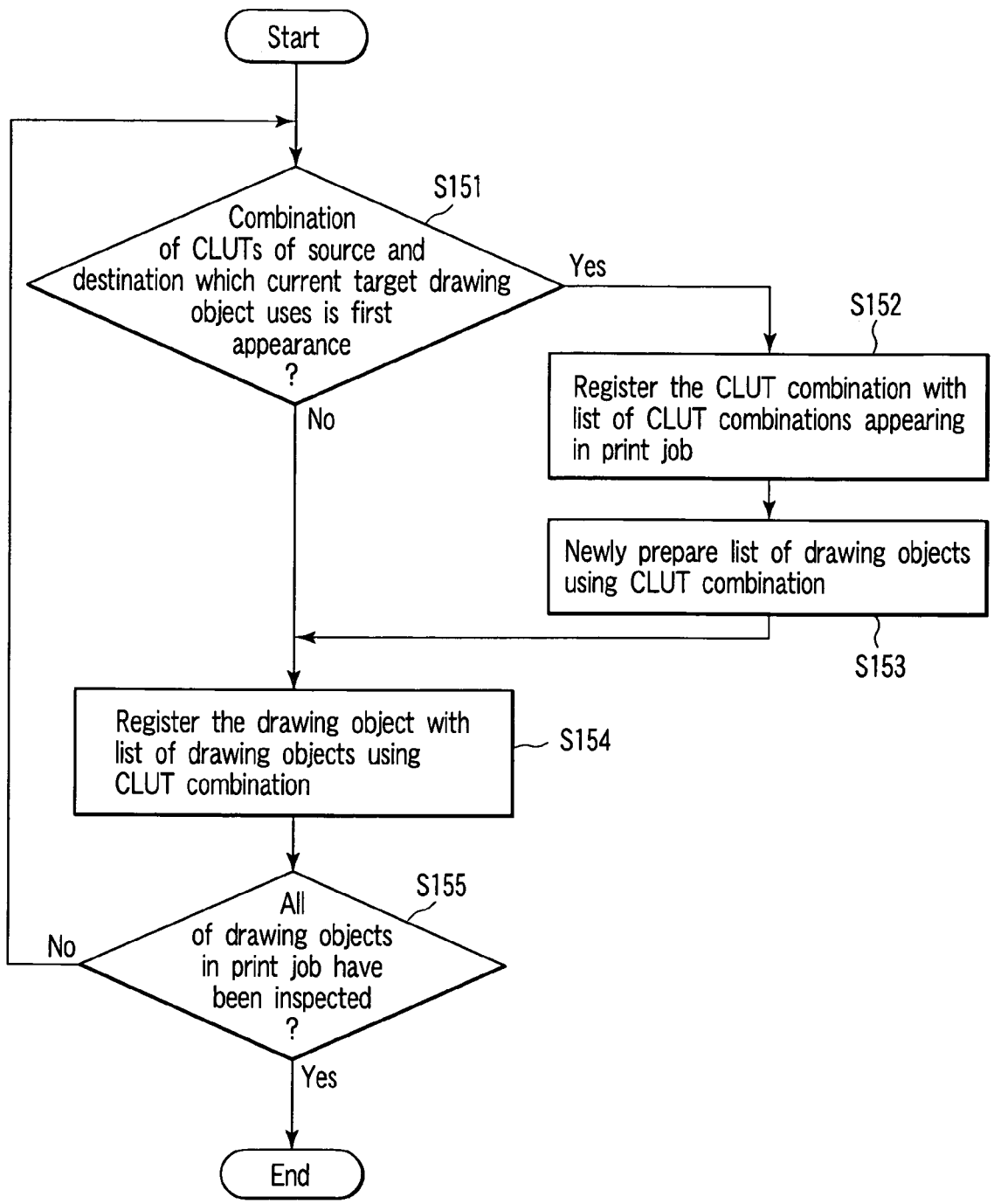
FIG. 11 is a flowchart for explaining one example of processing in which the CLUT combination-drawing object group correspondence list in the color conversion apparatus shown in FIG. 8.

FIG. 11 is for explaining a process of generating "extraction of the combinations of all of the Src. CLUT and the Dst. CLUT which appear in the job" and "CLUT combination-drawing object group correspondence list" listing the combinations of the extracted CLUT combinations and the drawing objects to be objects in step S132 described by FIG. 10.

As shown in FIG. 11, it is checked whether or not the CLUT combination corresponding to a target drawing object is the first appearance (S151).

In step S151, when it is checked that the CLUT combination is the first appearance (S151-Yes), the combination is registered in the CLUT combination-drawing object group correspondence list (the combination of the CLUTs and the target drawing object are associated with one another: S152). Next, a list in which the combination of the CLUTs and the object are associated with one another is newly prepared (S153).

On the other hand, in step S151, when it is checked that the CLUT combination has appeared (S151-No), the target object is associated with the entry of the CLUT combination which already exists in the CLUT combination-drawing object group correspondence list (S154)

Hereinafter, with respect to all of the drawing objects in the job, as described by steps S151 to S154, it is decided whether the combinations of the CLUTs are the first appearance or have already been registered (S155).

Figure 12:
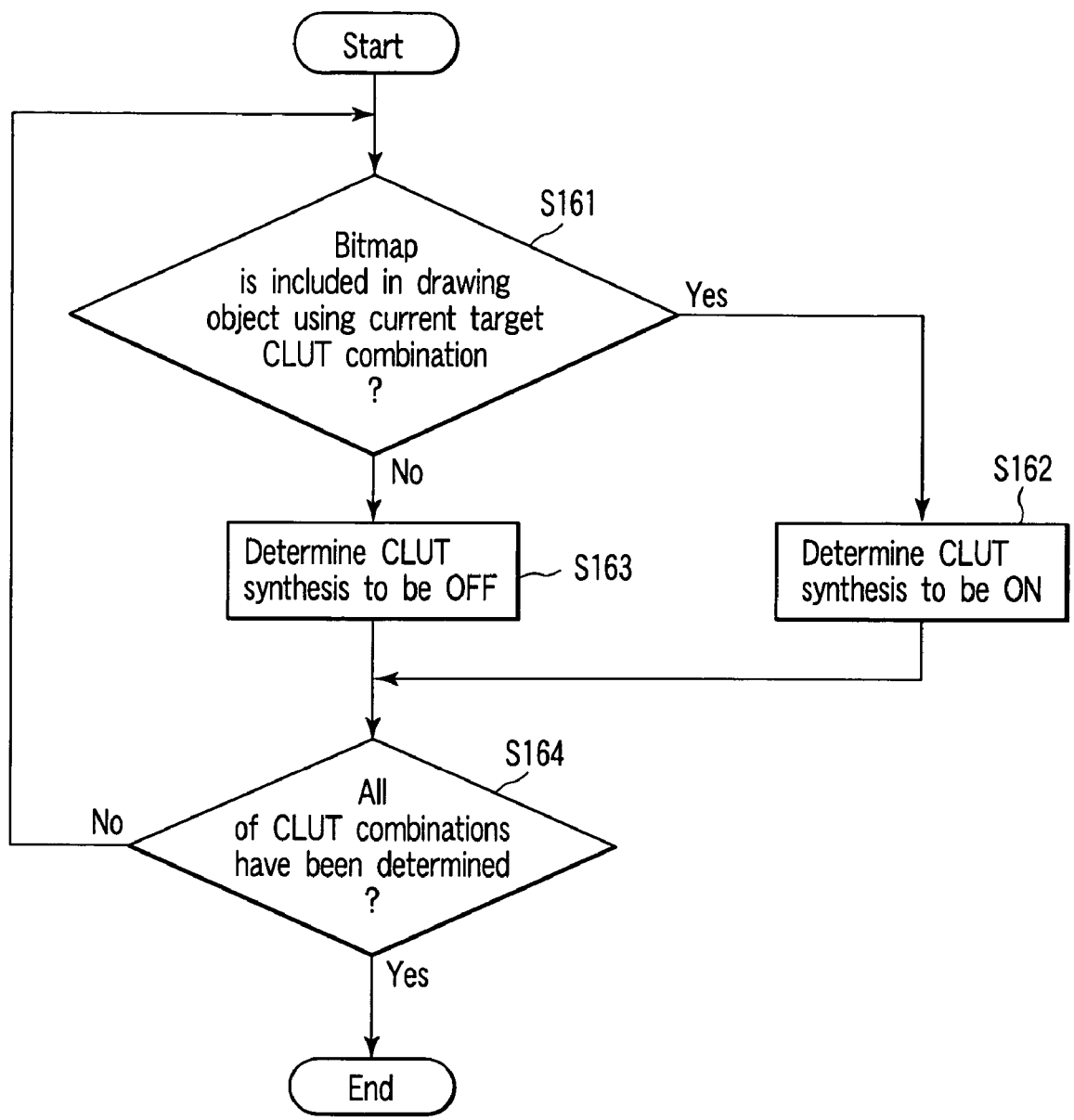
FIG. 12 is a flowchart showing one example of algorithm that determines CLUT synthesis ON/OFF on the basis of the presence or absence of a bitmap object in the color conversion apparatus shown in FIG. 8.

Next, one example of a concrete flow (determining algorithm) for determining whether synthesis of the CLUTs is carried out or not (ON/OFF) with respect to all of the CLUT combinations in the job will be shown in FIG. 12.

In FIG. 12, it is checked whether or not a bitmap object is included in the drawing object groups associated with the current target CLUT combination by the CLUT synthesis ON/OFF determining unit 14 (S161).

In step S161, when it is checked that a drawing object includes a bitmap object, (S161-Yes), CLUT synthesis is set to being ON (S162). On the other hand, when a bitmap object is not included therein (S161-No), CLUT synthesis is determined to be OFF (S163).

Hereinafter, with respect to all of the drawing objects in the job, the presence or absence of a bitmap object described by steps S161 to S163 is decided (S164).

Figure 13:
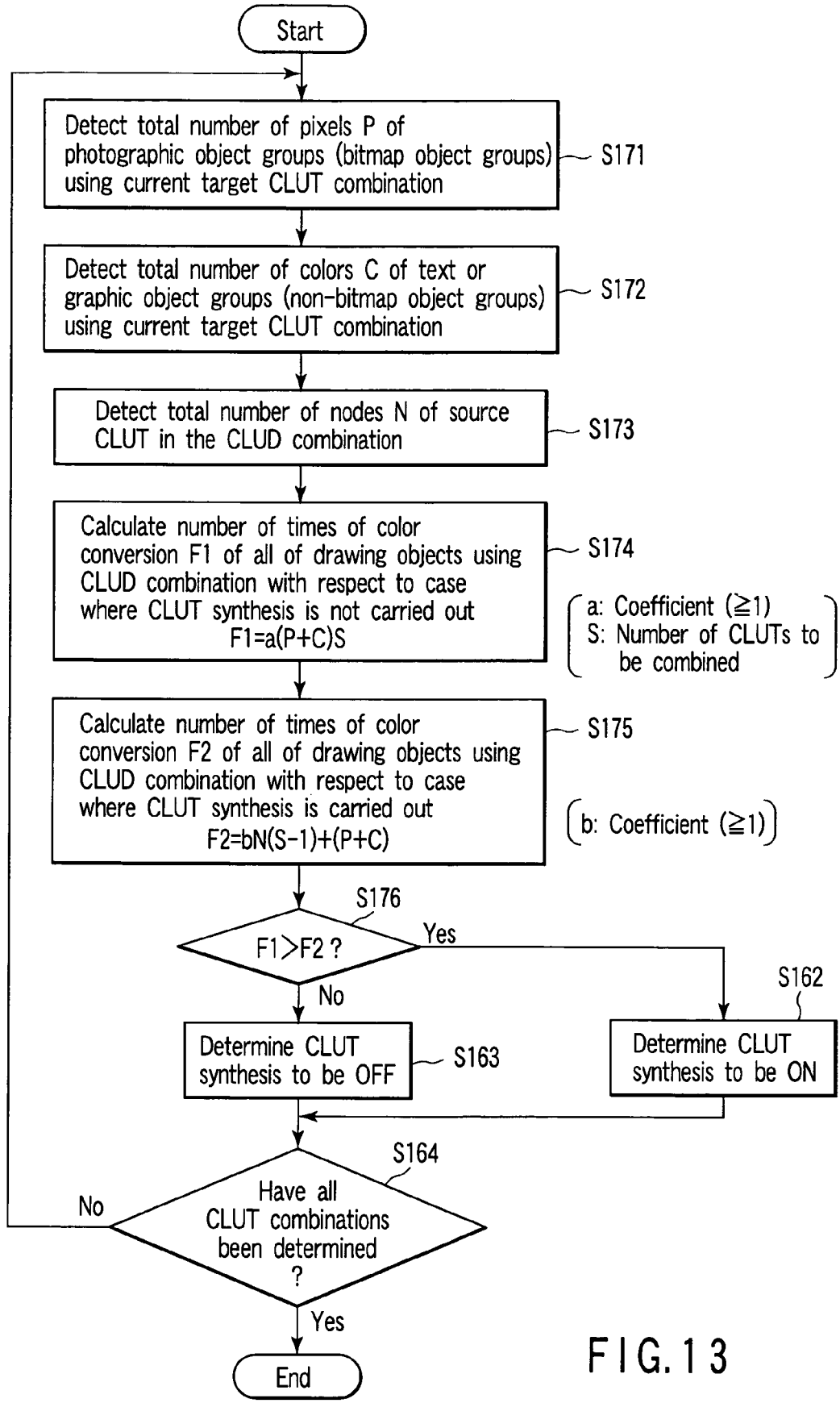
FIG. 13 is a flowchart showing one example of algorithm that determines CLUT synthesis ON/OFF on the basis of the number of pixels of the bitmap object, the number of colors of the non-bitmap object, the number of nodes of the initial CLUT, and the number of the stages of CLUT combinations in the color conversion apparatus shown in FIG. 8.

Another example of a CLUT synthesis ON/OFF determining algorithm is shown in FIG. 13.

In the example shown in FIG. 13, the CLUT synthesis ON/OFF determining unit 14 detects the total number of pixels P of the bitmap object groups associated with the current target CLUT combination, the total number of colors C of non-bitmap objects, the number of nodes of the initial CLUT in the CLUT combinations, i.e., the Src. CLUT, and the number of CLUTs (the number of steps) S in the CLUT combinations (S171 to S173). Note that the order of detecting can be arbitrarily set.

Next, the number of times of color conversion F1 of all of the drawing objects associated with the CLUT combinations when the CLUT synthesis is not carried out is calculated by the following formula (1).

$$F1 = a(P+C)S \qquad (1)$$

Here, a is a coefficient for weighting with respect to the number of times of color conversion, and is a value greater than or equal to 1. Further, usually, weighting is not carried out, thus the coefficient a is 1. The coefficient a is set in advance (S174).

Next, when CLUT synthesis is carried out, the number of times of color conversion F2 of all of the drawing objects associated with the CLUT combination when CLUT synthesis is carried out is calculated by the following formula (2).

$$F2 = bN(S-1) + (P+C) \qquad (2)$$

Here, b is a coefficient for weighting with respect to the number of times of color conversion, and is a value greater than or equal to 1. Further, usually, weighting is not carried out, thus the coefficient b is 1. The coefficient b is set in advance (S175).

The reason for that the coefficients a and b are respectively introduced in formula (1) and formula (2) is for reflecting that an operation load per color conversion is generally different in a case where color conversion is carried out on color data of the drawing object when CLUT synthesis is OFF, and in a case where color conversion for CLUT synthesis is carried out when CLUT synthesis is ON.

Hereinafter, the number of times of color conversion F1 and the number of times of color conversion F2 determined by formula (1) and formula (2) are compared with one another (S176), and when F1 is greater than F2 (S176-Yes), CLUT synthesis is determined to be ON (S162). Further, in the other cases (F1=F2, F2>F1, S176-No), CLUT synthesis is determined to be OFF (S163).

Hereinafter, with respect to all of the drawing objects in the job, the presence or absence of bitmap objects described by steps S171 to S176 is decided (S164).

Next, as the next step in the flow described above by FIG. 10, CLUT synthesis is carried out with respect to the combination of the CLUTs which has been determined such that CLUT synthesis is ON (corresponding to S134).

Subsequently, color conversion method definition on whether or not a synthesized CLUT is applied is determined with respect to each drawing object in the job (corresponding to S135).

Figure 14:
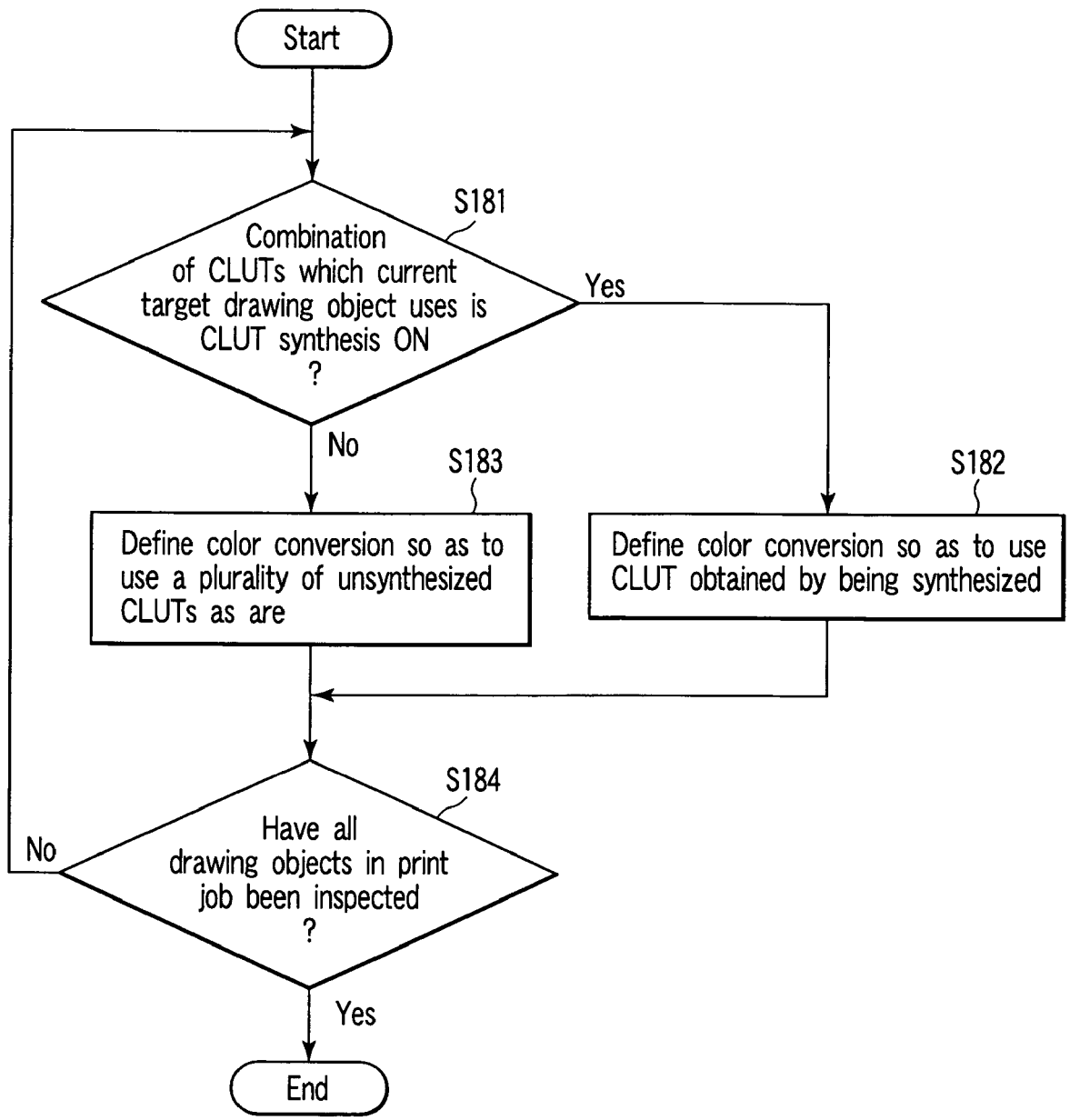
FIG. 14 is a flowchart showing one example of processing in which it is determined for each drawing object whether a synthesized CLUT is used or a plurality of unsynthesized CLUTs are used in the color conversion apparatus shown in FIG. 8 (when it is not expressly designated whether the synthesized CLUT is used or not)

FIG. 14 shows one example of processing in step S135 in FIG. 10. In FIG. 14, it is decided whether or not the CLUT combination associated with the current target drawing object is in a state of synthesis ON (S181), and when the CLUT combination is synthesis ON (S181-Yes), a color conversion method is defined so as to use the synthesized CLUT (S182). On the other hand, when the CLUT combination is in a state of synthesis OFF (S181-No), a color conversion method is defined so as to sequentially apply a plurality of unsynthesized CLUTs (S183).

Moreover, in FIG. 14, in the color conversion method definitions, a decision on whether or not the CLUT combination is in a state of synthesis ON described by step S181 is carried out with respect to all of the drawing objects in the job (S184).

Note that, in the color conversion apparatus 101 shown in FIG. 8, in the same way as in the color conversion apparatus 1 shown in FIG. 1, when an express instruction (which is designated in advance for each object, and can be varied by a method which will be described in FIG. 15 and hereinafter) of whether or not a synthesized CLUT is applied to each drawing object is carried out, the CLUT synthesis ON/OFF determining algorithm and algorithm of a color conversion method definition for each drawing object will be described hereinafter.

Note that, as means for providing an express instruction to a user, it is possible to display a user interface screen, for example, as shown in FIG. 15, on the display apparatus or the display unit 3a of the processor 3, for example, as shown in FIG. 8. In addition, as the timing of displaying the express instruction, the display example shown in FIG. 15 may be displayed, for example, at the stage when all of the drawing objects in the current job can be extracted.

FIG. 15 shows one example of display examples for providing an express instruction which is the result of the color conversion method definition described by using FIG. 14 to the user.

The user interface screen shown in FIG. 15 displays whether or not the CLUT synthesis with respect to each drawing object is ON, when the drawing objects (1) to (m) exist, and is an example in which CLUT synthesis ON/OFF is displayed by button indications (GUI=Graphical User Interface) at a row corresponding thereto for each drawing object shown by each line. Note that, in the example shown in FIG. 15, for example, CLUT synthesis is defined to be "ON" with respect to the drawing object (9). However, the CLUT synthesis can be changed to "Auto" or "OFF" by, for example, an input unit (a keyboard or a mouth (trade mark)) 3d or the like which is connected to the processor 3. Further, although not illustrated, for example, when a touch panel function is provided to the display unit (display apparatus) 3a, a color conversion method with respect to the object can be instructed to be changed from a display at an arbitrary row on the displayed screen.

Next, one example of the algorithm of determining CLUT synthesis ON/OFF when the above-described "express instruction" is provided to the user will be described by using FIG. 16. Note that, because the flow shown in FIG. 16 is a flow to which respective processes which will be described hereinafter are added prior to the step (S161) in which it is checked whether or not bitmap objects are included in the drawing object groups associated with the current target CLUT combination by the CLUT synthesis ON/OFF determining unit 14 described above by FIG. 12, the added portions will be mainly described.

Figure 16:
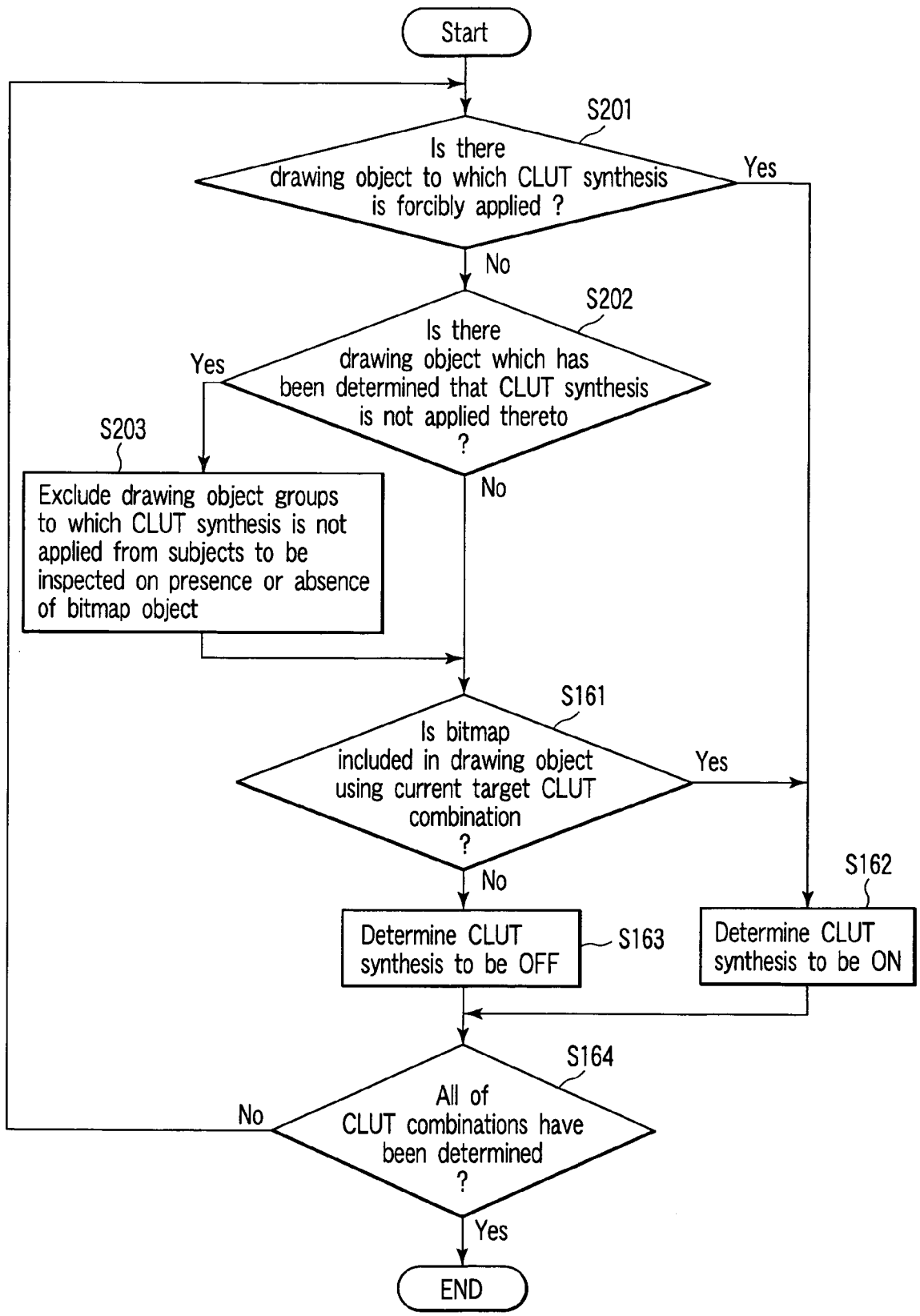
FIG. 16 is a flowchart showing one example of algorithm that determines CLUT synthesis ON/OFF on the basis of the presence or absence of a bitmap object in the color conversion apparatus shown in FIG. 8 (when it is expressly designated for each drawing object whether a synthesized CLUT is used or not)

As shown in FIG. 16, it is checked whether or not a drawing object to which CLUT synthesis is forcibly applied exists with respect to all of the CLUT combinations in the job (S201).

When there is an object in which it is expressed that a synthesized CLUT is applied among the drawing object groups associated with the target CLUT combination (S201-Yes), it is automatically determined that the CLUT synthesis is ON (S162).

In contrast thereto, when there is no object in which it is expressed that a synthesized CLUT is applied among the drawing object groups associated with the target CLUT combination (S201-No), it is inspected whether or not a bitmap object is included in the drawing objects using the target CLUT combination. However, when there is an object in which it is expressed that a synthesized CLUT is not applied (S202-Yes), the object groups in which it is expressed that the synthesized CLUT is not applied are excluded from the objects on which the presence or absence of a bitmap object is inspected (S203).

When it is not expressed that a synthesized CLUT is applied to the drawing objects (S202-No), and when a bitmap object is not included in the drawing objects (S161-No), it is determined that the CLUTs are not synthesized (it is maintained that CLUT synthesis is OFF, S163).

Figure 17A:
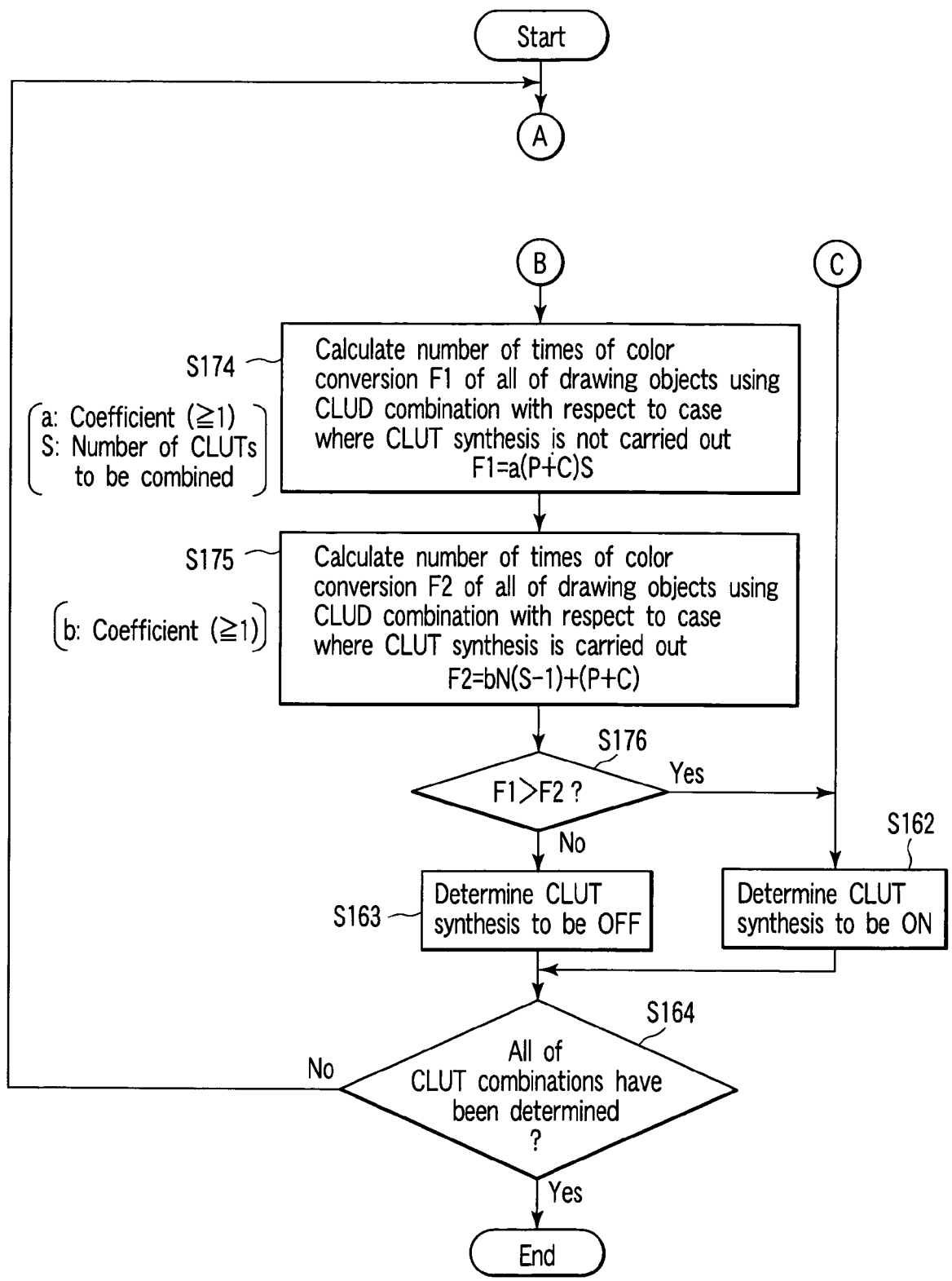
FIGS. 17A and 17B are flowcharts showing algorithm that determines CLUT synthesis ON/OFF on the basis of the number of pixels of the bitmap object, the number of colors of the non-bitmap object, the number of nodes of the initial CLUT, and the number of the stages of the CLUT combinations in the color conversion apparatus shown in FIG. 8 (when it is expressly designated for each drawing object whether a synthesized CLUT is used or not)

FIGS. 17A and 17A show an example which can be applied to the algorithm of determining of the CLUT synthesis ON/OFF described above by FIG. 13, in the same way described above by FIG. 16. Note that, because the flow shown in FIGS. 17A and 17A is a flow to which respective processes which will be described hereinafter are added prior to the step (S161) in which it is checked whether or not a bitmap object is included in the drawing object groups associated with the current target CLUT combination by the CLUT synthesis ON/OFF determining unit 14 described above by FIG. 13, the added portions will be mainly described.

Figure 17B:
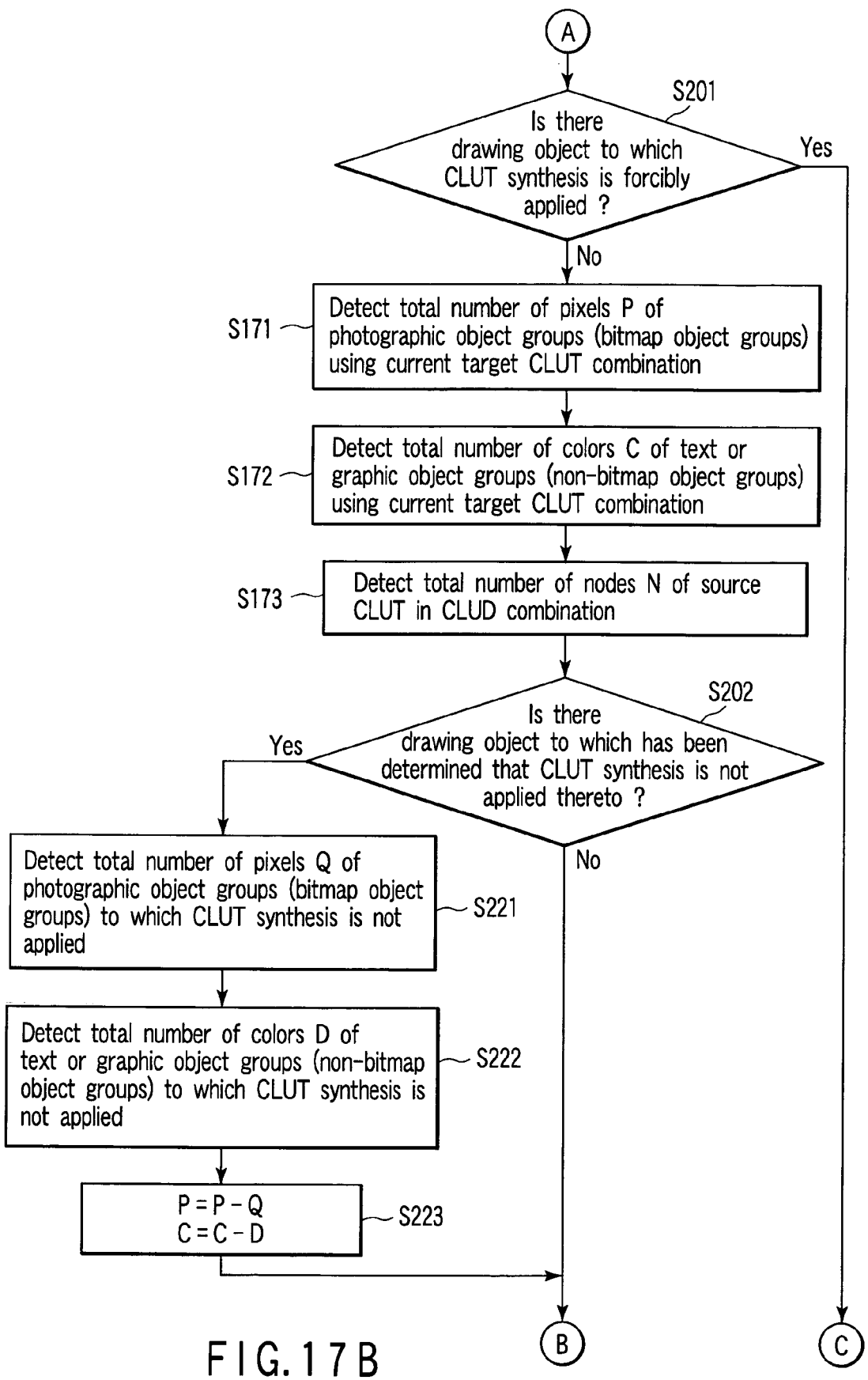

As shown in FIG. 17B, it is checked with respect to all of the CLUT combinations in the job whether or not a drawing object to which CLUT synthesis is forcibly applied exists (S201).

When there is an object in which it is expressed that a synthesized CLUT is applied among the drawing object groups (S201-Yes), it is automatically determined that a CLUT synthesis is ON (S162).

In contrast thereto, when there is no object in which it is expressed that a synthesized CLUT is applied among the drawing object groups (S201-No), the total number of pixels P, the total number of colors C of non-bitmap object groups, and the number of nodes of the Src. CLUT N are detected by steps S171 to S173.

Next, it is decided whether or not there is an object in which it is expressed that a synthesized CLUT is not applied (S202), and when there is no object in which it is expressed that synthesized CLUT is not applied (when it is not expressed that the synthesized CLUT is not applied, S202-No), the number of times of color conversion F1 and the number of times of color conversion F2 are determined by formula (1) and formula (2) (S174, S175), and the determined F1 and F2 are compared with one another (S176).

On the other hand, when there is an object in which it is expressed that the synthesized CLUT is not applied (S202-Yes), prior to the calculation of the number of times of color conversion F1 and the number of times of color conversion F2 by formula (1) and formula (2), the total number of pixels Q of the bitmap object associated with the target CLUT combination and the total number of colors D of the non-bitmap objects are detected (S221, S222). Note that the order of detecting can be arbitrarily set.

Next, the total number of pixels P (refer to step S171) and the total number of colors C (refer to step S172) detected previously are corrected by the total number of pixels Q and the total number of colors D determined in steps S221 and S222. Namely, respectively, the total number of pixels P determined in step S171 is corrected by "P=P−Q", and the total number of colors C determined in step S172 is corrected by "C=C−D". In other words, the number of times of color conversion F1 and the number of times of color conversion F2 are corrected by a value in which the values of the objects in which it is expressed that the CLUT synthesis is not applied are subtracted (S223).

Figure 18:
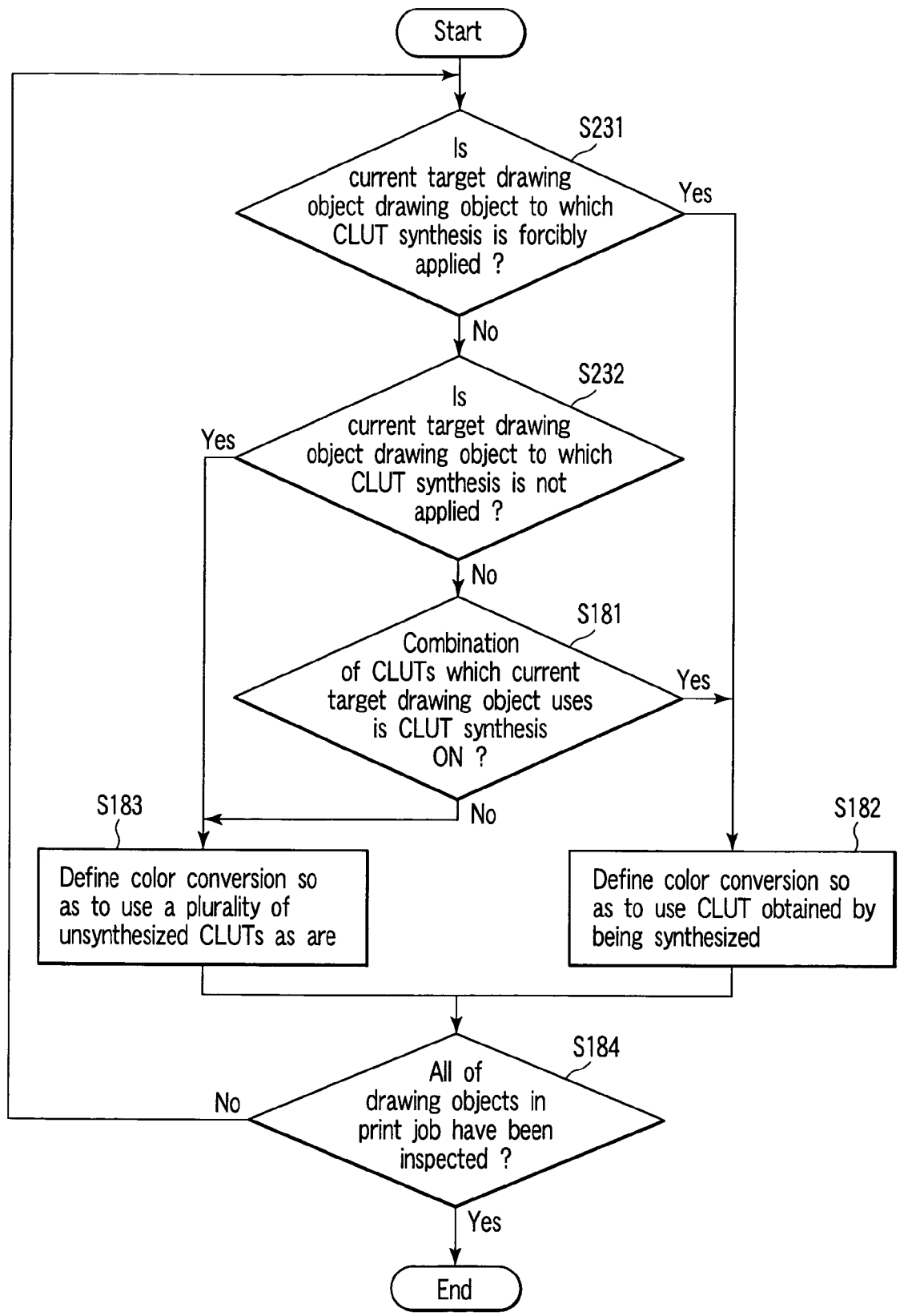
FIG. 18 is a flowchart showing one example of processing in which it is determined for each drawing object whether a synthesized CLUT is used or a plurality of unsynthesized CLUTs are used in the color conversion apparatus shown in FIG. 8 (when it is expressly designated whether a synthesized CLUT is used or not)

FIG. 18 shows one example of processing for providing "express instruction" to a user described above, when the color conversion method definition on whether or not a synthesis CLUT is applied is determined with respect to each of drawing objects in the job described above by step S135 in FIG. 10. Note that the flow shown in FIG. 18 is substantially the same as a flow in which a process (S231) of detecting whether or not it is expressed that a synthesis CLUT is applied to the target drawing object, and a process (S232) of detecting whether or not it is expressed that synthesis CLUT is not applied thereto are added to the previous step of "color conversion method definition (S181 to S184)" described above by FIG. 14.

On the other hand, in FIG. 18, when it is not expressed whether a synthesis CLUT is applied to is not applied, in the same way in step S181 described above by FIG. 14, a color conversion method is defined on the basis of the result of determining of synthesis ON/OFF of the CLUT combinations with which the drawing object is associated.

Figure 19:
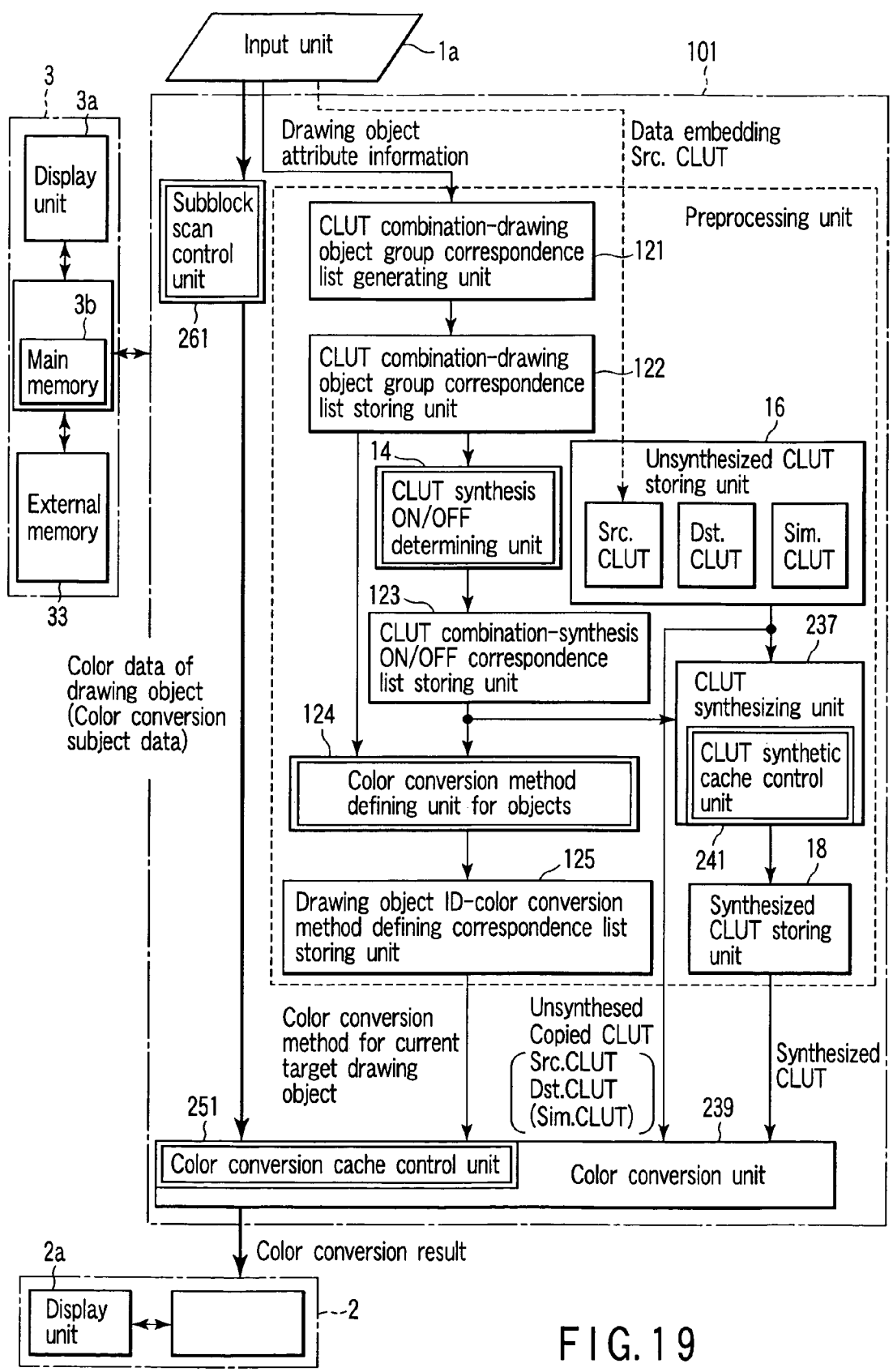
FIG. 19 is a schematic block diagram for explaining still another example of the color conversion apparatus to which the embodiment of the present invention is applied.

FIG. 19 is for explaining an example of a color conversion apparatus to which a further embodiment of the present invention is applied. Note that configurations which are similar to or the same as the configurations (factors) which have already been described by using FIG. 8 are denoted by the same reference numerals, and detailed description thereof will be omitted.

As shown in FIG. 19, a color conversion apparatus 201 is configured such that the CLUT synthesizing unit (17) in the color conversion apparatus 101 described above by FIG. 8 is replaced with a CLUT synthesizing unit 237 in which a CLUT synthetic cache control unit 241 is built-in, and the color conversion unit (129) is replaced with a color conversion unit 239 in which a color conversion cache control unit 251 is built-in. Note that, as a cache memory, for example, a main memory 3b built in the processor 3 shown in FIG. 8, an external memory 33 connected to the processor 3, or the like can be used.

Further, a subblock scan control unit 261 is provided between the input unit 1a and the color conversion unit 239.

In the color conversion apparatus 201 shown in FIG. 19, the color conversion cache control unit 251, the CLUT synthetic cache control unit 241, and the memory 3b (33) are useful for being able to shorten a processing time as the drawing object or the entire job.

For example, in printout (a text processing job), there are cases in which the same color conversion input condition (the combination of color conversion original color data and CLUTs is same) frequently arises. In particular, when data to be printed out inputted to the input unit 1a is a bitmap object such as a natural image or the like, there is a high probability that the same data is generated in the vicinity of one pixel.

In such a case, color conversion is not necessarily carried out for each pixel, the results of the color conversions are maintained in a cache memory, and by using a color conversion result cached when the color conversion input condition which is the same as those arising within previous several pixels in the past, a processing time for each drawing object or as the entire job can be shortened.

Note that, in order to improve the effect of the color conversion cache control unit, i.e., a hit ratio of caches, it is more preferable that the order of supplying image data of the bitmap objects of the text processing job to the color conversing unit is made to be the same as the order of the subblock scans which will be described hereinafter by FIG. 21B.

Further, in the color conversion apparatus 201 shown in FIG. 19, the synthesized results of the CLUTs can be cached by the CLUT synthetic cache control unit 237 in the CLUT synthesizing unit 237. In accordance therewith, a synthesized CLUT can be commonly used among a plurality of text processing jobs (among the processing jobs other than the text processing for the same text).

Note that the cache memory used at the CLUT synthesizing unit 237 is not limited to the main-memory 3b of the processor 3 described above, and for example, it is possible to use a part of the synthesized CLUT storing unit 18 (the substance of a cache memory is commonly used by the synthesized CLUT storing unit).

Incidentally, the CLUT synthetic cache control unit 241 does not erase the synthesized CLUT which is once stored in the synthesized CLUT storing unit 18 at the same time of completing the job, and is useful for storing and managing the synthesized CLUT in accordance with the method of cache memory so as to reuse it when the same CLUT combination is generated.

Figure 20:
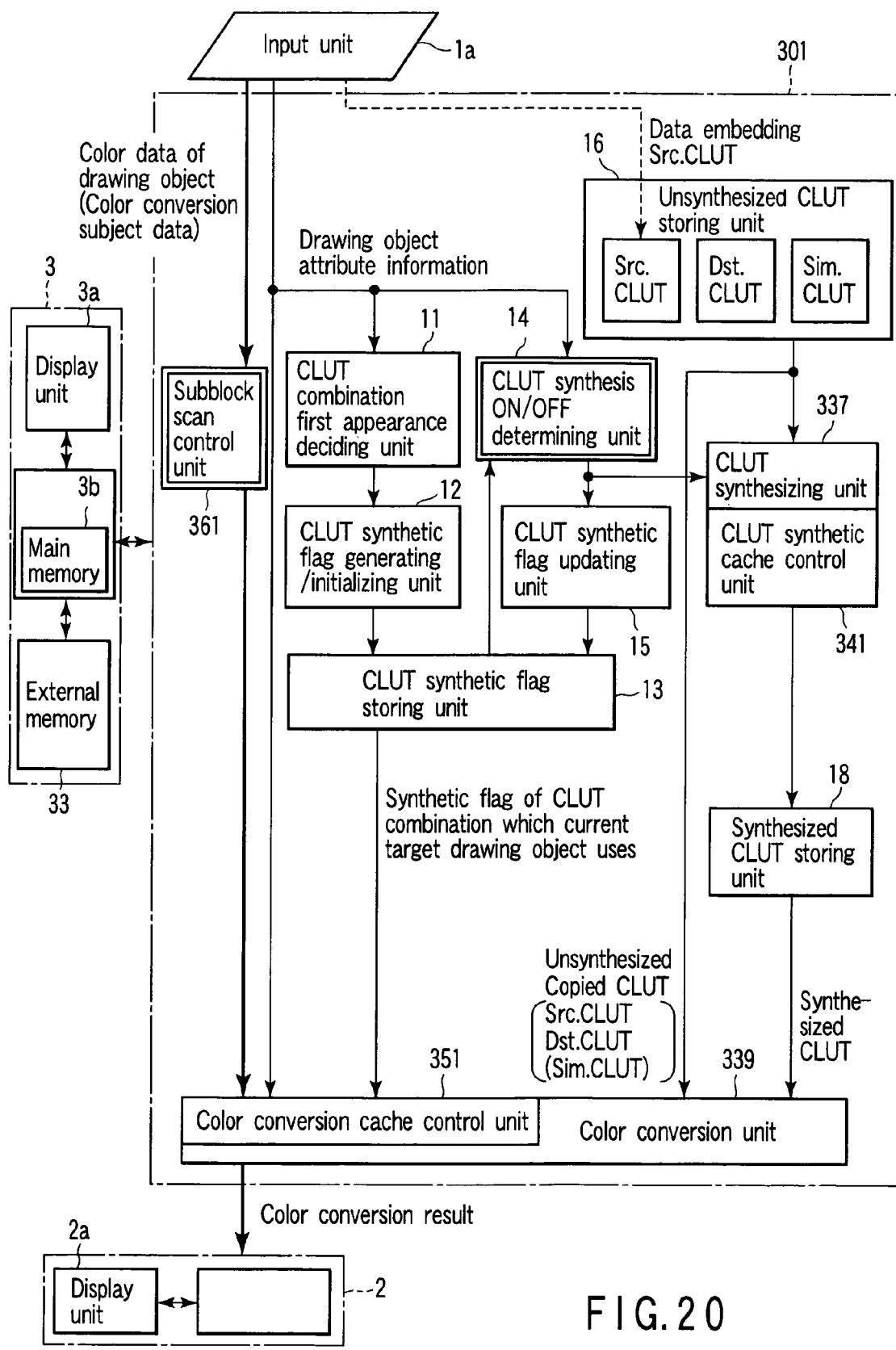
FIG. 20 is a schematic block diagram for explaining still another example of the color conversion apparatus to which the embodiment of the present invention is applied.

FIG. 20 shows an example in which the feature of the color conversion apparatus shown in FIG. 19 is applied to the color conversion apparatus described above by FIG. 1 as well.

The synthesized CLUT which is once stored in the synthesized CLUT storing unit 18 is reused when the same CLUT combination arises in the following job. Since, the CLUT synthetic cache control unit 241 and the color conversion cache control unit 251 can be configured independently from the color conversion method definition defined at the color conversion method defining unit 124 (refer to FIG. 8), provided that the synthesized result of the CLUTs is cached. Thus, an arbitrary configuration can be used as the basic configuration of the color conversion apparatus. In order to improve the effect of the color conversion cache control unit, i.e., a hit ratio of caches, it is more preferable that the order of supplying image data of the bitmap object of the text processing job to the color conversing unit is made to be the order of the subblock scan which will be described hereinafter by FIG. 21B.

More specifically, a color conversion apparatus 301 shown in FIG. 20 is configured such that the CLUT synthesizing unit (17) already described above by FIG. 1 is replaced with a CLUT synthesizing unit 337 in which a CLUT synthetic cache control unit 341 is built-in, and the color conversion unit (19) is replaced with a color conversion unit 339 in which a color conversion cache control unit 351 is built-in. Note that, because the configurations and the operations of the respective factors are the same as the portions corresponding thereto described above, detailed description thereof will be omitted. However, it goes without saying that the configuration and the principle of the present invention are supported by the descriptions (explanations) of the portions corresponding thereto.

Figure 21A:
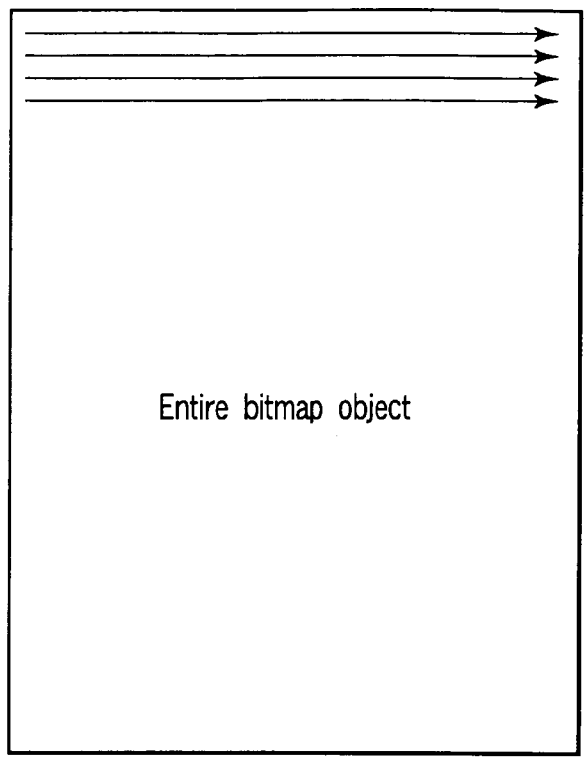
FIG. 21A is a schematic diagram for explaining a concept of a raster scan which is a method for reading image information.

FIG. 21A conceptually shows normal signal processing (image reading) in a system in which a bitmap object is made to be an image signal by scanning. Note that the reading method shown in FIG. 21A is called a raster scan in many cases.

Figure 21B:
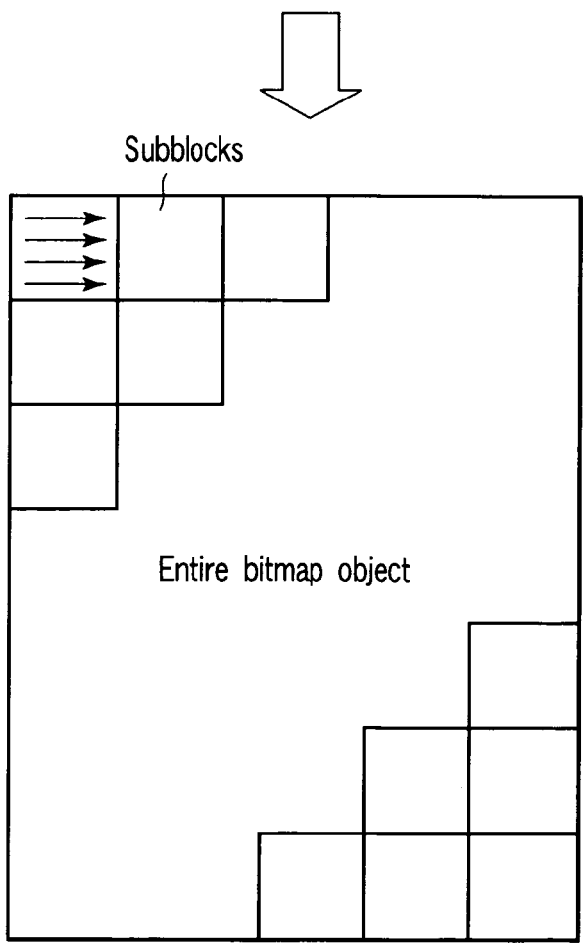
FIG. 21B is a schematic diagram for explaining a concept of a raster scan with subblocks which is the method for reading image information of the present invention.

FIG. 21B conceptually shows that, when the entire bitmap object is converted into an image signal by scanning described above by FIGS. 19 and FIG. B, the entire bitmap object is divided into an arbitrary number of subblocks, and those are scanned. It can be distinguished that, by using the subblocks as shown in FIG. 21B, a hit ratio in which the existing CLUT combinations which the color conversion unit cache maintains are hit (matched) in the bitmap object that there are many cases in which the same data exists in the relative vicinity.

As described above, in accordance with the color conversion apparatus of the present invention, the CLUT combinations used for color conversion of a bitmap object are synthesized into one CLUT, and color conversions of respective pixels of the bitmap object can be carried out by only one time by using the one synthesized CLUT. On the other hand, the CLUT combinations which are not used for color conversion of a bitmap object are not synthesized unless there is an instruction particular. In accordance therewith, a color conversion method in which the processing time is short is automatically selected in accordance with the characteristic of the drawing object, and the effect of accelerating color conversion can be obtained.

Further, in accordance with the color conversion apparatus of the present invention, the number of operations of the color conversions are compared with one another for each CLUT combination on the basis of the structural information of the entire text processing job, and because a color conversion method in which the processing time is short is automatically selected before starting the job, color conversion is accelerated.

Moreover, in accordance with the color conversion apparatus of the present invention, color conversion can be further accelerated due to the cache effect of the results of the color conversions. Further, due to the cache effect of the results of the CLUT syntheses, the total necessary time for the color conversions required for a series of plural text processing jobs is shortened.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A color image processing apparatus, comprising:
    color look-up table (CLUT) synthesis ON/OFF determining means for determining whether or not a single synthesized CLUT is generated by synthesizing a plurality of CLUTs with respect to a plurality of CLUT groups which are sequentially referred at a time of carrying out color conversion on a drawing object, for each drawing object which is a component of text data, on the basis of attribute information of the drawing object;
    CLUT synthesis ON/OFF storing means for storing determined results determined by the synthesis ON/OFF determining means;
    CLUT synthesizing means for generating the single synthesized CLUT by carrying out CLUT synthesis at the time when the determination by the synthesis ON/OFF determining means is varied from OFF to ON;
    synthesized CLUT storing means for storing the synthesized CLUT which is a result that arbitrary CLUTs among said plurality of CLUT groups are synthesized by the CLUT synthesizing means; and
    color conversion means for carrying out color conversion with respect to an arbitrary drawing object on the basis of the attribute information of the drawing object and the stored contents of the CLUT synthesis ON/OFF storing means, with reference to CLUTs to be applied to the drawing object from one of the synthesized CLUT and a predetermined CLUT among said plurality of CLUT groups.

2. A color image processing apparatus according to claim 1, wherein the CLUT synthesis ON/OFF determining means determines a CLUT combination which a target drawing object uses to be CLUT synthesis ON when the attribute information of the drawing object is bitmap data.

3. A color image processing apparatus according to claim 2, wherein the CLUT synthesis ON/OFF determining means maintains the stored contents held in the CLUT synthesis ON/OFF storing means with respect to the CLUT combination which the target drawing object uses when it is designated that the target drawing object uses a plurality of unsynthesized CLUTs.

4. A color image processing apparatus according to claim 1, wherein, when the stored contents of the CLUT synthesis ON/OFF storing means are in a state of synthesis OFF with respect to the CLUT combination, the CLUT synthesis ON/OFF determining means newly determines synthesis ON/OFF on the basis of the attribute information of the target drawing object and updates the stored contents of the CLUT synthesis ON/OFF storing means on the basis of the determined result, and when the stored contents of the CLUT synthesis ON/OFF storing means are in a state of synthesis ON, the CLUT synthesis ON/OFF determining means maintains the state of synthesis ON regardless of the attribute information of the target drawing object.

5. A color image processing apparatus according to claim 4, wherein the CLUT synthesis ON/OFF determining means maintains the stored contents held in the CLUT synthesis ON/OFF storing means with respect to the CLUT combination which the target drawing object uses when it is designated that the target drawing object uses a plurality of unsynthesized CLUTs.

6. A color image processing apparatus according to claim 1, further comprising:
cache means for holding results of color conversions by the color conversion means.

7. A color image processing apparatus according to claim 6, further comprising:
CLUT synthetic cache control means for using the synthesized CLUT held by the cache means in place of carrying out the CLUT synthesis itself when a CLUT combination corresponding to the synthesized CLUT which has been stored in the cache means and used in a text processing job appears in a new text processing job.

8. A color image processing apparatus according to claim 1, further comprising:
subblock scan control means for dividing an entire area of a drawing object into an arbitrary number of subblocks, and supplying image data to the color conversion means in order of raster-scanning in the respective subblocks.

9. A color image processing apparatus comprising:
CLUT combination-drawing object association generating means for associating CLUT combinations and drawing objects which appear in processing on the basis of processing contents of text data;
CLUT synthesis ON/OFF determining means for determining ON/OFF of CLUT synthesis for each CLUT combination on the basis of attribute information of respective objects of associated drawing object groups;
CLUT synthesizing means for synthesizing CLUTs with respect to each CLUT combination in which a determined result by the CLUT synthesis ON/OFF determining means is ON; and
color conversion means for carrying out color conversion with respect to each of individual drawing objects on the basis of attribute information of each drawing object and the determined result of the CLUT synthesis ON/OFF with which each drawing object is associated, with reference to one of the synthesized CLUT and a plurality of unsynthesized CLUT groups.

10. A color image processing apparatus according to claim 9, wherein the CLUT synthesis ON/OFF determining means determines CLUT synthesis to be ON when an arbitrary object among the associated drawing object groups includes a bitmap object.

11. A color image processing apparatus according to claim 9, wherein the CLUT synthesis ON/OFF determining means compares amounts of operations for color conversions in a case of CLUT synthesis ON and in a case of CLUT synthesis OFF on the basis of the total number of pixels P of bitmap object groups among the associated drawing object groups, the total number of colors C of non-bitmap object groups among the associated drawing object groups, the number of nodes N of an initial CLUT among CLUT groups configuring CLUT combinations, and the number of CLUTs S configuring a target CLUT combination, and determines one of the CLUT synthesis ON and the CLUT synthesis OFF such that the number of times of color conversion are reduced.

12. A color image processing apparatus according to claim 11, wherein the CLUT synthesis ON/OFF determining means determines CLUT synthesis to be ON when $$a(P+C)S > bN(S-1)+(P+C),$$

provided that a and b are respectively coefficients greater than or equal to 1.

13. A color image processing apparatus according to claim 9, wherein the CLUT synthesis ON/OFF determining means compares amounts of operations for color conversions which are calculated on the basis of the number of times of color conversion, a weighting factor (including 1) per color conversion when CLUT synthesis is carried out, and a weighting factor (including 1) per color conversion when CLUT synthesis is not carried out, in a case of CLUT synthesis ON and in a case of CLUT synthesis OFF, on the basis of the total number of pixels P of bitmap object groups among the associated drawing object groups, the total number of colors C of non-bitmap object groups among the associated drawing object groups, the number of nodes N of an initial CLUT among the CLUT groups configuring a current target CLUT combination, and the number of CLUTs S configuring the current target CLUT combination, and determines one of the CLUT synthesis ON and the CLUT synthesis OFF such that the number of times of color conversion are reduced.

14. A color image processing apparatus according to claim 13, wherein the CLUT synthesis ON/OFF determining means determines CLUT synthesis to be ON when $$a(P+C)S > bN(S-1)+(P+C),$$

provided that a and b are respectively coefficients greater than or equal to 1.

15. A color image processing apparatus according to claim 9, further comprising:
CLUT synthesis ON/OFF forcibly determining means for, when there exists a drawing object for which it is designated that the synthesized CLUT is used among the associated drawing object groups, determining the CLUT synthesis to be ON regardless of the determined result by the CLUT synthesis ON/OFF determining means.

16. A color image processing apparatus according to claim 15, further comprising:

display means for reporting that the CLUT synthesis is determined to be ON regardless of the determined result by the CLUT synthesis ON/OFF determining means, by the CLUT synthesis ON/OFF forcibly determining means.

17. A color image processing apparatus according to claim 9, wherein, when there exists a drawing object for which it is designated that a plurality of unsynthesized CLUTs are used among the associated drawing object groups, the CLUT synthesis ON/OFF determining means determines synthesis ON/OFF of the CLUT synthesis on the basis of attribute information of only drawing objects except for the drawing objects for which it is designated that a plurality of unsynthesized CLUTs are used.

18. A color image processing apparatus according to claim 17, further comprising:

display means for reporting that the CLUT synthesis is determined to be ON regardless of the determined result of the CLUT synthesis ON/OFF determining means, by the CLUT synthesis ON/OFF forcibly determining means.

19. A color image processing apparatus according to claim 9, further comprising:

cache means for holding results of color conversions by the color conversion means.

20. A color image processing apparatus according to claim 19, further comprising:

CLUT synthetic cache control means for using the synthesized CLUT held by the cache means in place of carrying out the CLUT synthesis itself when a CLUT combination corresponding to the synthesized CLUT which has been stored in the cache means and used in a text processing job appears in a new text processing job.

21. A color image processing apparatus according to claim 9, further comprising:

subblock scan control means for dividing an entire area of a drawing object into an arbitrary number of subblocks, and supplying image data to the color conversion means in order of raster-scanning in the respective subblocks.

\* \* \* \* \*